US011089486B2

(12) United States Patent
Dong et al.

(10) Patent No.: US 11,089,486 B2
(45) Date of Patent: Aug. 10, 2021

(54) SERVICE COVERAGE MANAGEMENT SYSTEMS AND METHODS

(71) Applicant: Convida Wireless, LLC, Wilmington, DE (US)

(72) Inventors: Lijun Dong, San Diego, CA (US); Michael F. Starsinic, Newtown, PA (US)

(73) Assignee: Convida Wireless, Wilmington, DE (US)

( * ) Notice: Subject to any disclaimer, the term of this patent is extended or adjusted under 35 U.S.C. 154(b) by 125 days.

(21) Appl. No.: 15/030,394

(22) PCT Filed: Oct. 24, 2014

(86) PCT No.: PCT/US2014/062161
§ 371 (c)(1),
(2) Date: Apr. 19, 2016

(87) PCT Pub. No.: WO2015/061675
PCT Pub. Date: Apr. 30, 2015

(65) Prior Publication Data
US 2016/0242043 A1 Aug. 18, 2016

Related U.S. Application Data

(60) Provisional application No. 61/894,977, filed on Oct. 24, 2013.

(51) Int. Cl.
H04W 16/20 (2009.01)
H04W 24/02 (2009.01)
(Continued)

(52) U.S. Cl.
CPC ............ H04W 16/20 (2013.01); H04W 4/70 (2018.02); H04W 24/02 (2013.01); H04W 24/10 (2013.01);
(Continued)

(58) Field of Classification Search
CPC ..... H04W 4/005; H04W 4/021; H04W 4/022; H04W 16/20; H04W 24/02; H04W 24/10;
(Continued)

(56) References Cited

U.S. PATENT DOCUMENTS 7,158,790 B1 * 1/2007 Elliott ................... H04W 16/00
455/446
8,023,451 B2 * 9/2011 Swann .................. H04W 48/12
370/328
(Continued)

FOREIGN PATENT DOCUMENTS

EP 2 605 610 6/2013
JP 2004-253849 A 9/2004
(Continued)

OTHER PUBLICATIONS

Japanese Patent Application No. 2016-525581: Reasons for Rejection dated Aug. 2, 2017, 4 pages.
(Continued)

Primary Examiner — Asad M Nawaz
Assistant Examiner — Kai Chang
(74) Attorney, Agent, or Firm — BakerHostetler

(57) ABSTRACT

A Service Coverage Manager (SCM) may receive or retrieve a report of a service node's coverage and generate a global picture of the service coverage for a service. The SCM may dynamically adjust the service node coverage to accommodate client service requests and provide new service coverage to appropriate clients. The SCM may reduce a service node's service coverage to reduce overlap with another node or reduce wasted resources, or may expand a service node's coverage to cover additional clients.

20 Claims, 22 Drawing Sheets

(51) Int. Cl.
*H04W 4/70* (2018.01)
*H04W 24/10* (2009.01)
*H04L 29/08* (2006.01)
*H04L 12/40* (2006.01)
*H04L 12/801* (2013.01)
*H04W 84/18* (2009.01)
*H04W 4/021* (2018.01)

(52) U.S. Cl.
CPC ........ *H04L 12/40039* (2013.01); *H04L 47/14* (2013.01); *H04L 67/18* (2013.01); *H04W 4/021* (2013.01); *H04W 4/022* (2013.01); *H04W 84/18* (2013.01)

(58) Field of Classification Search
CPC .. H04W 84/18; H04W 4/70; H04L 12/40039; H04L 47/14; H04L 67/18
See application file for complete search history.

(56) References Cited

U.S. PATENT DOCUMENTS

| | | | |
|---|---|---|---|
| 8,437,764 B2 | 5/2013 | Doettling et al. | |
| 8,462,751 B1* | 6/2013 | Dehghan | H04L 12/1485 370/338 |
| 8,879,506 B1* | 11/2014 | Singh | H04W 36/0016 370/331 |
| 9,100,818 B2* | 8/2015 | Lee | H04W 8/26 |
| 9,621,646 B2* | 4/2017 | Fu | H04L 65/4076 |
| 10,117,169 B2* | 10/2018 | Xie | H04W 48/20 |
| 2003/0097464 A1* | 5/2003 | Martinez | H04L 29/06 709/238 |
| 2004/0098395 A1* | 5/2004 | Hisano | G06N 5/022 |
| 2004/0157620 A1* | 8/2004 | Nyu | H04W 4/20 455/456.1 |
| 2004/0192336 A1* | 9/2004 | Walby | H04W 48/18 455/456.1 |
| 2005/0134499 A1 | 6/2005 | Liu et al. | |
| 2005/0152320 A1* | 7/2005 | Marinier | H04W 16/06 370/338 |
| 2006/0099960 A1* | 5/2006 | Duan | H04W 8/10 455/456.2 |
| 2006/0114850 A1* | 6/2006 | Avinash | H04W 40/22 370/328 |
| 2006/0132302 A1* | 6/2006 | Stilp | G05B 9/03 340/539.22 |
| 2007/0082677 A1* | 4/2007 | Donald Hart | H04W 16/18 455/456.1 |
| 2007/0218893 A1* | 9/2007 | Tatman | H04W 24/08 455/423 |
| 2008/0062933 A1* | 3/2008 | Liu | H04W 48/12 370/332 |
| 2009/0132675 A1* | 5/2009 | Horn | H04W 8/26 709/207 |
| 2009/0190579 A1* | 7/2009 | Witzel | H04L 12/5692 370/353 |
| 2009/0288152 A1* | 11/2009 | Huber | G06Q 20/1235 726/6 |
| 2009/0310501 A1* | 12/2009 | Catovic | H04W 24/08 370/252 |
| 2010/0118830 A1* | 5/2010 | Stephenson | H04L 63/10 370/331 |
| 2010/0322070 A1* | 12/2010 | Wang | H04L 47/125 370/230 |
| 2011/0087766 A1* | 4/2011 | Kuo | G06Q 10/06 709/224 |
| 2011/0294499 A1* | 12/2011 | Vikberg | H04W 24/02 455/423 |
| 2011/0300871 A1* | 12/2011 | Dottling | H04W 24/02 455/446 |
| 2012/0008512 A1* | 1/2012 | Wahlqvist | H04W 52/0232 370/252 |
| 2012/0039166 A1* | 2/2012 | Gao | H04W 24/02 370/221 |
| 2013/0070615 A1* | 3/2013 | Lennartson | H04W 52/0206 370/242 |
| 2013/0188515 A1 | 7/2013 | Pinheiro | |
| 2013/0237231 A1* | 9/2013 | Nagaraja | H04W 24/02 455/438 |
| 2013/0242720 A1* | 9/2013 | Chou | H04L 12/2854 370/221 |
| 2013/0287012 A1* | 10/2013 | Pragada | H04W 76/25 370/338 |
| 2013/0294285 A1* | 11/2013 | Zhang | H04W 24/02 370/254 |
| 2014/0073317 A1* | 3/2014 | Zhou | H04W 28/0205 455/424 |
| 2014/0126530 A1* | 5/2014 | Siomina | H04W 52/146 370/330 |
| 2014/0162629 A1* | 6/2014 | Tipton | H04W 24/02 455/423 |
| 2014/0323119 A1* | 10/2014 | Bader | H04W 24/02 455/419 |
| 2015/0230184 A1* | 8/2015 | Raleigh | H04L 41/0893 370/230 |
| 2015/0237504 A1* | 8/2015 | Xie | H04W 16/10 455/454 |
| 2015/0289125 A1* | 10/2015 | Van Phan | H04W 76/14 455/434 |
| 2015/0341837 A1* | 11/2015 | Zhao | H04W 36/14 455/436 |
| 2016/0183147 A1* | 6/2016 | Da Silva | H04W 36/0055 370/331 |
| 2016/0198364 A1* | 7/2016 | Schwarzbauer | H04W 28/08 370/331 |

FOREIGN PATENT DOCUMENTS

| | | |
|---|---|---|
| JP | 2006-352477 A | 12/2006 |
| JP | 2009-282641 A | 12/2009 |
| WO | WO 2015-061675 | 4/2015 |

OTHER PUBLICATIONS

International Application No. PCT/US2014/062161: International Search Report and The Written Opinion dated Mar. 10, 2015, 12 pages.

One M2M Techinical Specification, OneM2M-TS-0001 "Functional Architecture" V-0.0.7, Aug. 26, 2013, 43 pages.

Korean Patent Application No. 10-2016-7013611: Korean Office Action dated Feb. 15, 2017, 7 pages, (No translation).

* cited by examiner

SERVICE COVERAGE MANAGEMENT SYSTEMS AND METHODS

This case is a National Stage Application filed under 35 U.S.C. 371 of International Application No. PCT/US2014/062161, filed Oct. 24, 2014, which claims priority to, and herby incorporates by reference, the application "SERVICE COVERAGE MANAGEMENT SYSTEMS AND METHODS" filed Oct. 24, 2013 with application No. 61/894,977.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold. M2M technologies introduce new challenges in determining service areas or service coverage for nodes that provide services because the service layer does not have knowledge or control over the service coverage provided by such nodes.

SUMMARY

Disclosed herein are methods, devices, and systems related to a Service Coverage Manager (SCM) that may receive, from a service node, reports of the service node's coverage. Alternatively, the SCM may retrieve the service coverage of a service node from other entities, such as a cluster head of one or more sensors. An SCM may also interpret the service coverage of all service nodes and generate a global picture of the service coverage for a service. An SCM may dynamically adjust the service node coverage to accommodate client service requests and provide new service coverage to appropriate clients. If there is overlap in the service coverage between two service nodes, an SCM may reduce one of the service nodes' service coverage. If there is no client or a small number of clients requesting a service in a certain coverage for some time, an SCM may reduce the corresponding service node's service coverage. If there are a large number of requesters in a certain coverage area such that the service node is not able to service the requesters properly, an SCM may enlarge the service coverage of other service nodes (e.g. adjacent geographically) to cover at least some part of that area and may facilitate the transfer of some of the clients to those other service nodes. If there are clients that are not covered by any service node, an SCM may select other service nodes and adjust their service coverage to allow unserved clients to receive service based on service node context information such as location, load, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

M2M may refer to any technology that enables networked devices to exchange information and perform actions without the manual assistance of humans. Components of an M2M system may include sensors, radio frequency identification (RFID), Wi-Fi links, cellular communications links, and autonomic computing software programmed to help a networked device interpret data and make decisions. By using deployed M2M devices and the data produced by them, M2M systems can provide various services. For example, services that perform motion/humidity sensing, warehouse management, remote control, traffic control, fleet management, etc., may be enabled by M2M systems.

As used herein, "service node" represents a node that provides a particular service. Each service has a definition of service coverage that normally can be summarized into two categories, each of which is extensible. The first service coverage category is geographic area, which may be the physical area that a service node may cover (e.g., service node's sensing area.)

Figure 1:
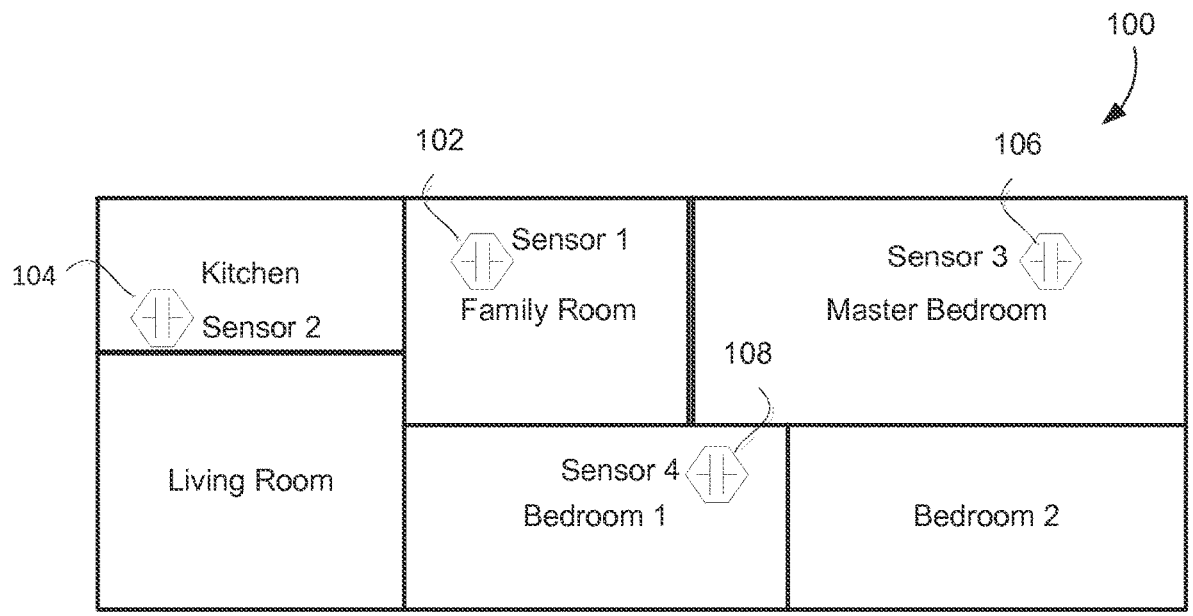
FIG. 1 is a diagram that illustrates an example of motion sensors' service coverage as defined by geographic area.

FIG. 1 is a diagram that illustrates an example of motion sensors' service coverages as defined by geographic area 100. In the illustrated example, sensor 1 102 covers the kitchen and family room, sensor 2 104 covers the living room and kitchen, sensor 3 106 covers the master bedroom and bedroom 2, and sensor 4 108 covers bedroom 1 and bedroom 2. In this example, clients are the rooms in the home and the service nodes are sensors 1, 2, 3, and 4. In one embodiment, the angle of the lens for the motion sensors may be changed to achieve different area of coverage.

Figure 2:
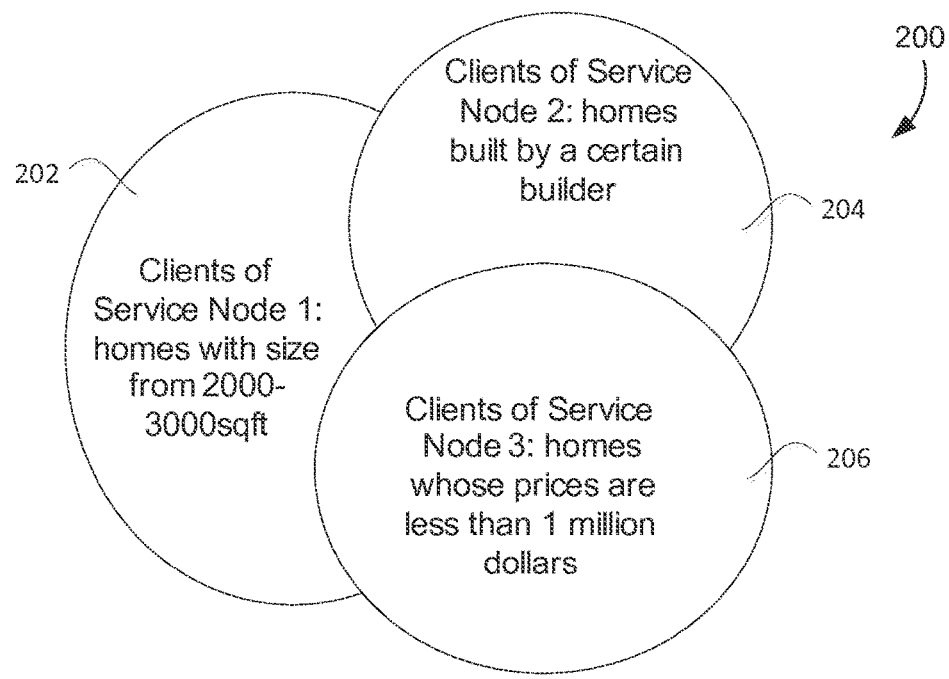
FIG. 2 is a diagram that illustrates visual representation of this type of service coverage defined by the set of clients that may be admitted by a service node.

A second service coverage category is accepted clients, which include clients that are accepted by a service node. These clients may include preconfigured individuals or groups of clients that satisfy certain rules. FIG. 2 is a diagram that illustrates visual representation 200 of this type of service coverage defined by the set of clients that may be admitted by a service node. For example, service node 1 202 manages readings from homes with size from 2000-3000 square feet, service node 2 204 manages readings from homes built by a certain builder, and service node 3 206 manages readings from homes whose prices are less than 1 million dollars.

Figure 3A:
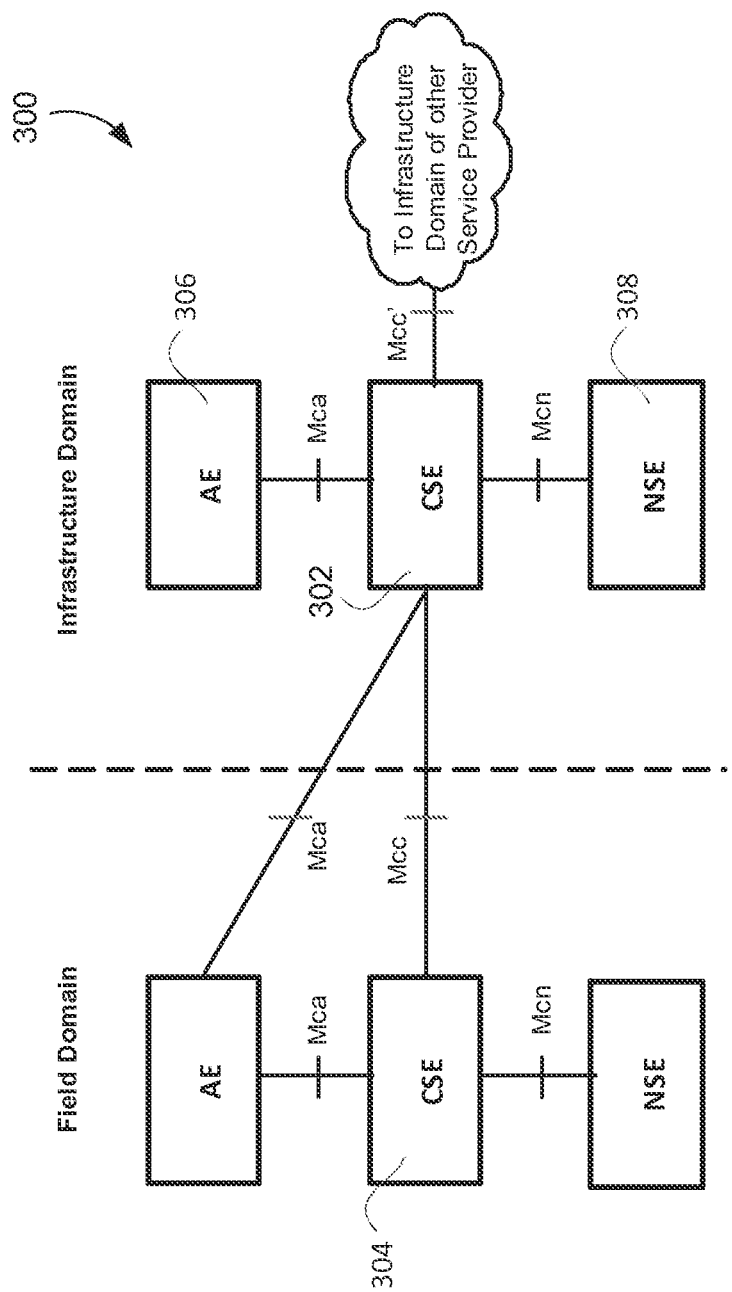
FIG. 3A is a diagram that illustrates an exemplary oneM2M functional architecture
Figure 3B:
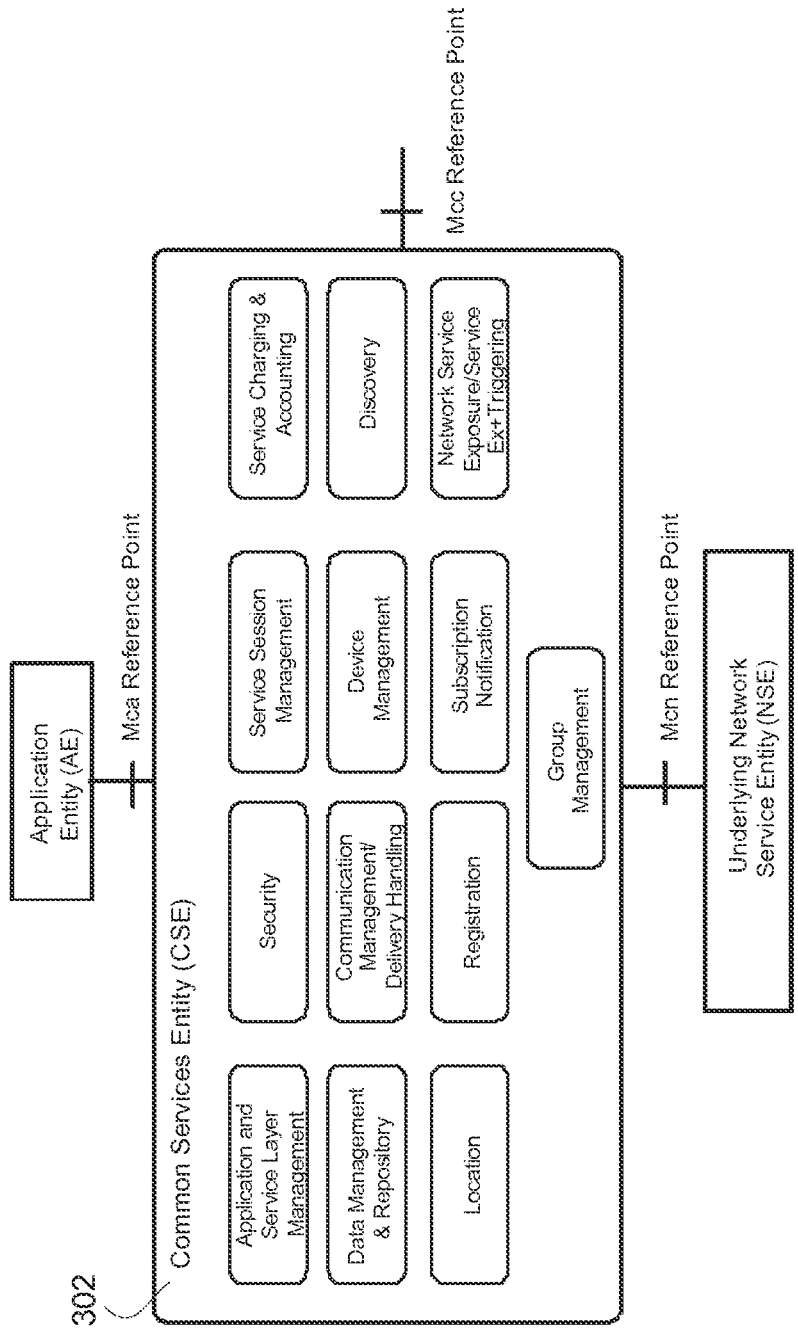
FIG. 3B is a diagram that illustrates the exemplary CSFs under development for a oneM2M architecture.

FIG. 3A is a diagram that illustrates an exemplary oneM2M functional architecture 300. The oneM2M standard under development defines a Service Layer called "Common Service Entity (CSE)" 302 and 304 as illustrated in FIG. 3A. The purpose of the Service Layer is to provide "horizontal" services that can be utilized by different 'vertical' M2M silo systems and applications, such as e-Health, fleet management, and smart homes. CSE 302 supports four reference points. The Mca reference point interfaces with the Application Entity (AE) 306. The Mcc reference point interfaces with another CSE 304 within the same service provider domain and the Mcc' reference point interfaces with another CSE in a different service provider domain. The Mcn reference point interfaces with the underlying network service entity (NSE) 308. An NSE 308 provides underlying network services to the CSEs 302, such as device management, location services and device triggering. CSE 302 contains multiple logical functions called "Common Service Functions (CSFs)", such as "Discovery", "Data Management & Repository". FIG. 3B is a diagram that illustrates exemplary CSFs under development for a oneM2M architecture.

In some embodiments, multiple providers (i.e., service nodes) may provide the same service, each of which may have its own service coverage. When a service node's service coverage is defined by a geographic area it may overlap the coverage area of another node providing the same service. While some overlapping may be intentional for reliability and quality of service purposes this may result in a waste of service node resources. For example, in FIG. 1, both sensor 1 102 and sensor 2 104 may sense the motion in the kitchen while both sensor 3 106 and sensor 4 108 may sense the motion in bedroom 2. Here, either or both of sensor 1 or sensor 2's lens angle may be changed to save the power consumption. Similarly, either or both of sensor 3 or sensor 4's lens angle may be changed to save the power consumption too.

There may be a geographic area that is not covered by any service nodes for a particular service. This may not be desirable in many use cases, such as sensor sensing. For example, in the service of traffic monitoring, there may be a road that is not covered by any cameras or sensors deployed on a section of the road. As a result, there may not be any data for that section of the road that may be used to, for example, indicate whether the road is congested or not.

When a service node's service coverage is defined by a set of clients, the service node may have been set up to serve a large group of clients and therefore may be configured with a correspondingly large amount of resources. However, the service node may have fewer requesters connecting locally, which may waste service node resources. Alternatively, a service node may have to reject service requests because it is set up to serve a small client group. It may not know how to transfer the clients to other service nodes or adjust its acceptance rule to accommodate those clients. There also may be a certain group of clients that may be rejected by all service nodes since acceptance rules may be set up independently by each service node.

In current implementations, a Service Layer may have no knowledge or control of the service coverage of each service node. In order to prevent waste of resources or lack of service provision to clients, the Service Layer in the disclosed embodiments may dynamically manage service nodes' coverage based on various kinds of context information, such as service node location, service node remaining power, service node load, etc.

In an embodiment, a Service Coverage Manager (SCM) may be implemented that may receive, from a service node, reports of the service node's coverage. Alternatively, the SCM may retrieve the service coverage of a service node from other entities, such as a cluster head of one or more sensors. An SCM may also interpret the service coverage of all service nodes and generate a global picture of the service coverage for a service. An SCM may dynamically adjust the service node coverage to accommodate client service requests and provide new service coverage to appropriate clients. If there is overlap in the service coverages between two service nodes, an SCM may reduce one of the service nodes' service coverage. If there is no client or a small number of clients requesting a service in a certain coverage for some time, an SCM may reduce the corresponding service node's service coverage. If there is such a large number of requesters in a certain coverage area that the service node is not able to service them properly, an SCM may enlarge the service coverage of other service nodes (e.g. adjacent geographically) to cover that area and may facilitate the transfer of some of the clients to those service nodes. If there are clients that are not covered by any service node, an SCM may select other service nodes and adjust their service coverage to allow unserved clients to receive service based on service node context information such as location, load, etc.

Figure 4:
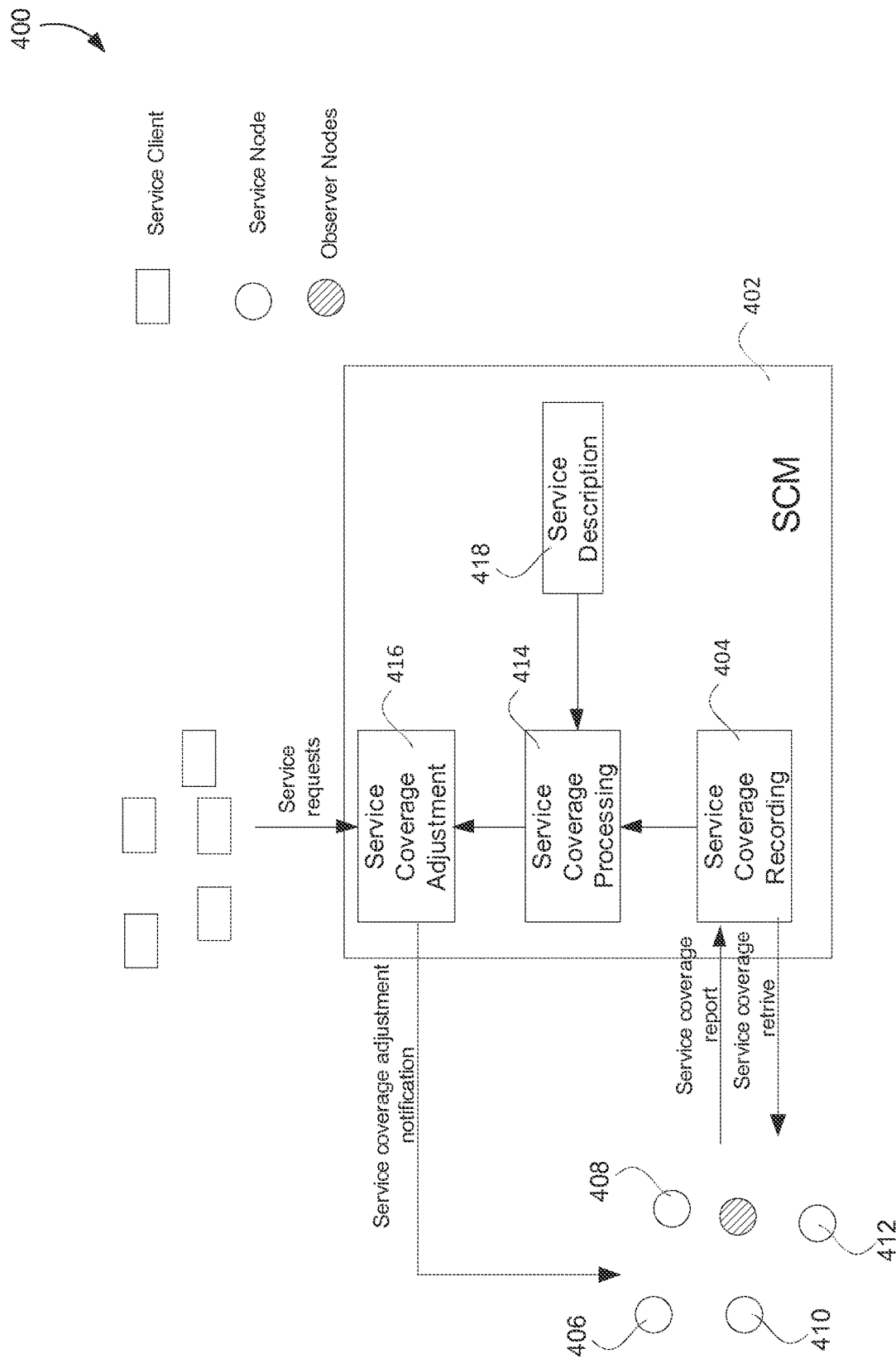
FIG. 4 is a diagram that illustrates exemplary non-limiting architecture of an exemplary SCM.

FIG. 4 illustrates exemplary non-limiting architecture 400 of an exemplary SCM 402. An SCM 402 may interact with service nodes, potential observer nodes, service clients, and backend servers for service coverage detection, processing, and adjustment. An SCM 402 may have several components, including a service description that describes the properties of a service, e.g. service nodes, service scope, etc., as further described herein. An SCM 402 may also have a service coverage recording component 404 that may receive or retrieve information about the service coverage of each service node 406, 408, 410 and 412 for a service. Use of this component may allow an SCM 402 to detect coverage through service coverage reports as further described herein. An SCM 402 may also have a service coverage processing component 414 that may generate an overall description or summary of the service coverage of all service nodes 406, 408, 410 and 412 for a service. An SCM 402 may determine the overlap or gap in service node coverage for a service as further described herein. An SCM 402 may provide an interface for applications or backend servers to process service description and service coverage report data and generate a complete "picture" of the service coverage instead of the SCM 402 doing this processing itself. Such applications or servers may include analytics servers and data analytics applications. An SCM 402 may also have a service coverage adjustment component 416 that may adjust the service coverage of certain service nodes 405, 408, 410 and 412 to accommodate the client service requests or in anticipation of client service requests as further described herein.

It is understood that the functionality of the SCM 402 as illustrated in FIG. 4, may be implemented in the form of software (i.e., computer-executable instructions) stored in a memory of, and executing on a processor of, a node of an M2M network (e.g., a server, gateway, device, or other computer system), such as one of those illustrated in FIG. 23C or 23D described below.

Figure 5:
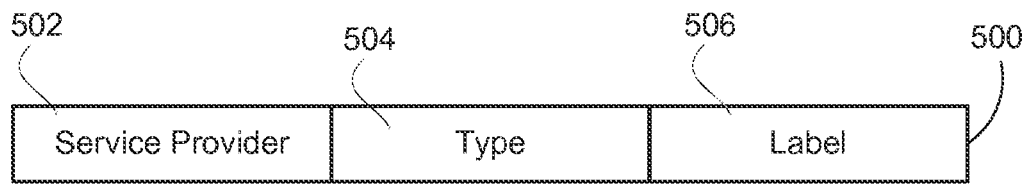
FIG. 5 is a diagram that illustrates an exemplary non-limiting service identifier.

The service description component 418 may maintain the properties of a service provided by an M2M service provider and may be used by the service coverage processing component. M2M service providers may deploy service nodes 406, 408, 410 and 412 for a particular service. The properties of a service may include, but are not limited to, a service identifier that may be a unique identifier of the service. A service identifier may be used to identify a service in a service coverage report, a service request, and/or a service coverage adjustment notification issued to or received from other components of the SCM 402. This field may be mandatory for a service. The service identifier may be assigned by the service layer or the service provider to ensure its uniqueness. Exemplary service identifier 500 is illustrated in FIG. 5, which may be constructed from the name of the service provider 502, the type of the service 504, and a label 506 of the service. The label may only be unique among services of the same type provided by the same service provider.

Figure 6:
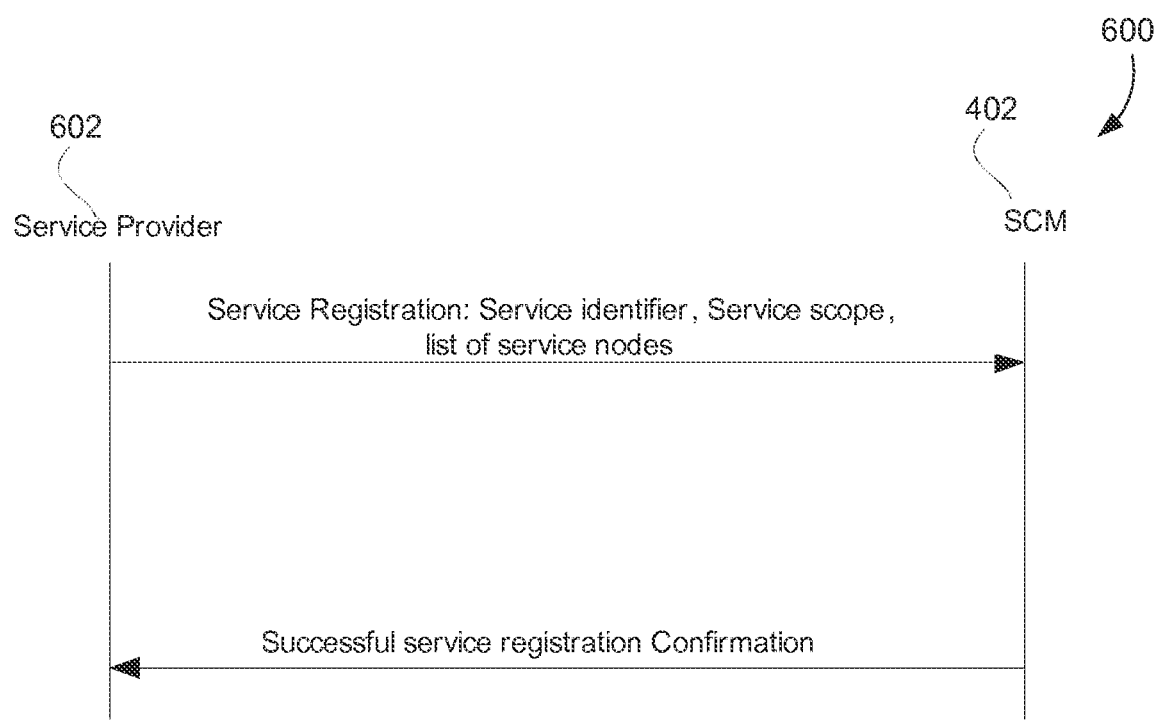
FIG. 6 is a diagram that illustrates exemplary non-limiting signal flow of service registration.

The properties of a service maintained by a service description component may also include a list of service nodes that may include the active service nodes for certain service. For example, in FIG. 1, the service nodes are sensor 1 102, sensor 2 104, sensor 3 106 and sensor 4 108. This field may also mandatory for a service. The properties of a service maintained by a service description component may also include service scope that may describe the whole coverage of the service. For example, in FIG. 1 the service scope may be to detect motion in the whole house, which geographically may include the kitchen, living room, family room, master bedroom, bedroom 1, and bedroom 2. The service scope may be the superset of the service coverage of all service nodes for a service. This field may not be completely accurate depending on whether the service provider provides such information to the service layer. If information is missing for a service, the SCM 402 may regard the total geographic areas covered by all service nodes as the service scope for a geographically defined coverage service. For a client defined coverage service, the SCM 402 may regard the union of the client sets of all service nodes as the service scope. The service scope field may be optional. In the disclosed embodiments, it is assumed that the service scope is available to the SCM 402 at the service layer, either provided by the service provider or derived by the SCM 402. Note that the service layer may be the service provider as well. For example, the service could be device management provided by the service layer. FIG. 6 illustrates exemplary non-limiting signal flow 600 of service registration, from which the service provider 602 may inform the service layer about the service properties listed above. The service description component will record the information.

Figure 23A:
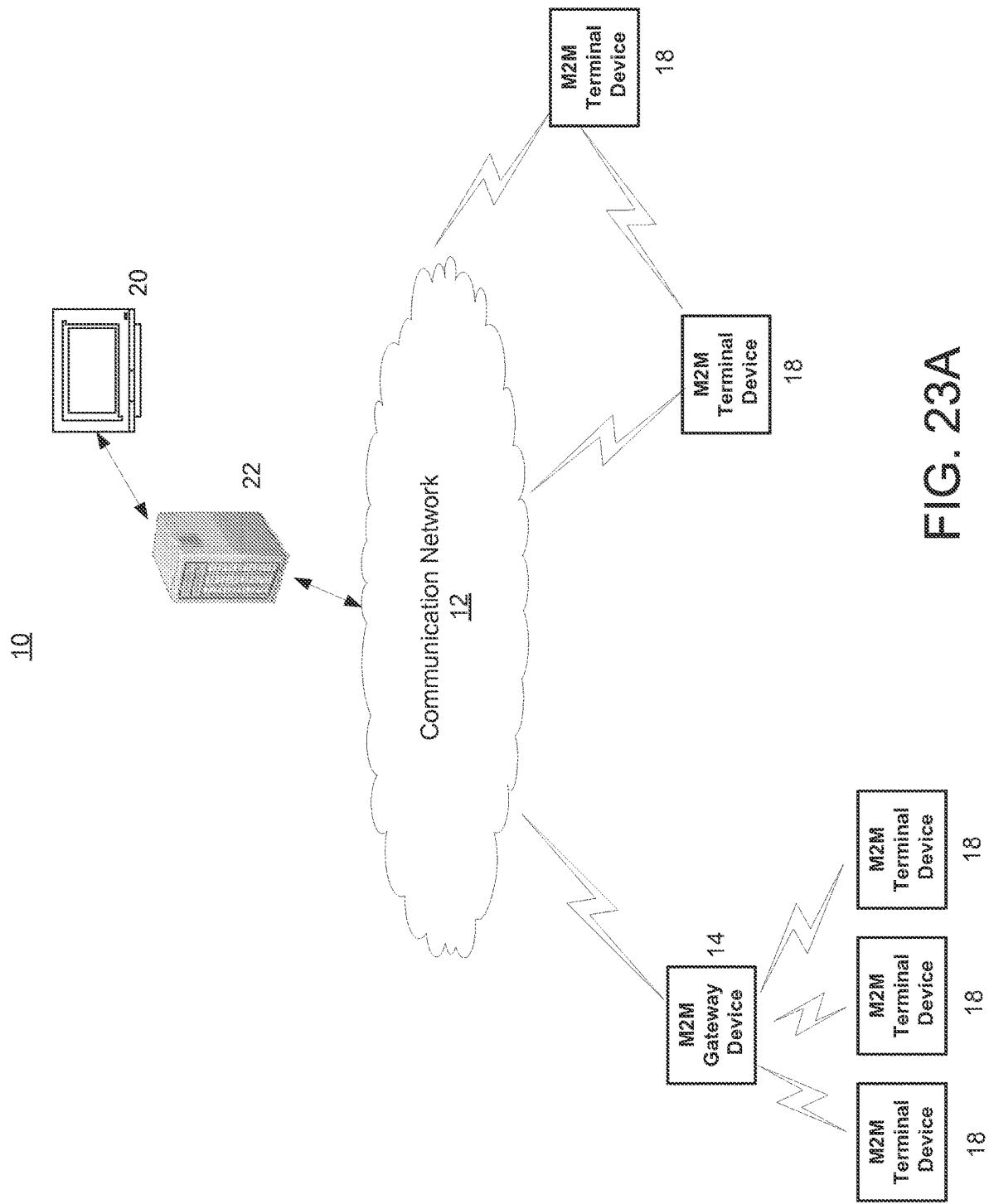
FIG. 23A is a system diagram of an example machine-to-machine (M2M) or Internet of Things (IoT) communication system in which one or more disclosed embodiments may be implemented.
Figure 23B:
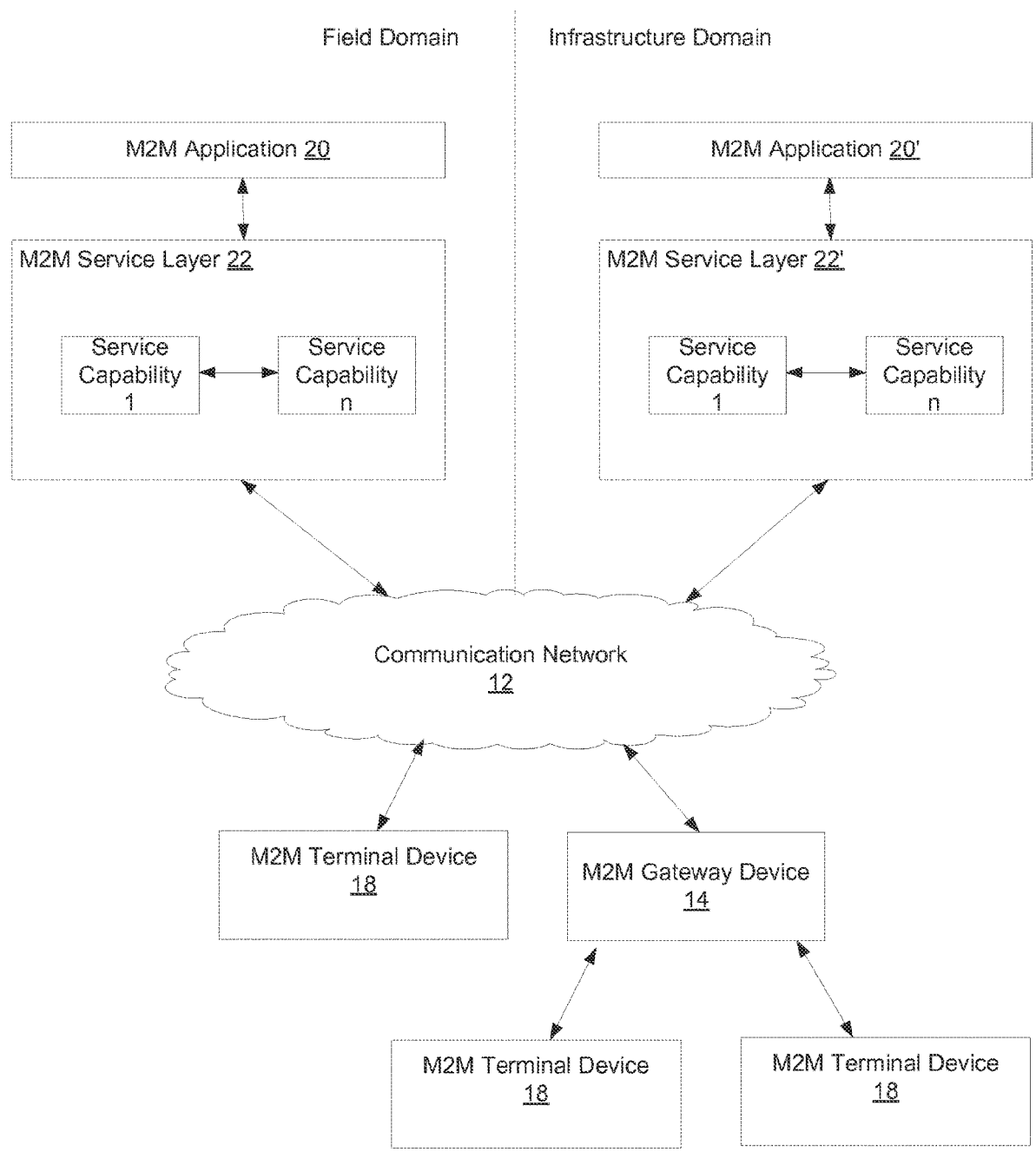
FIG. 23B is a system diagram of an example architecture that may be used within the M2M/IoT communications system illustrated in FIG. 23A.
Figure 23C:
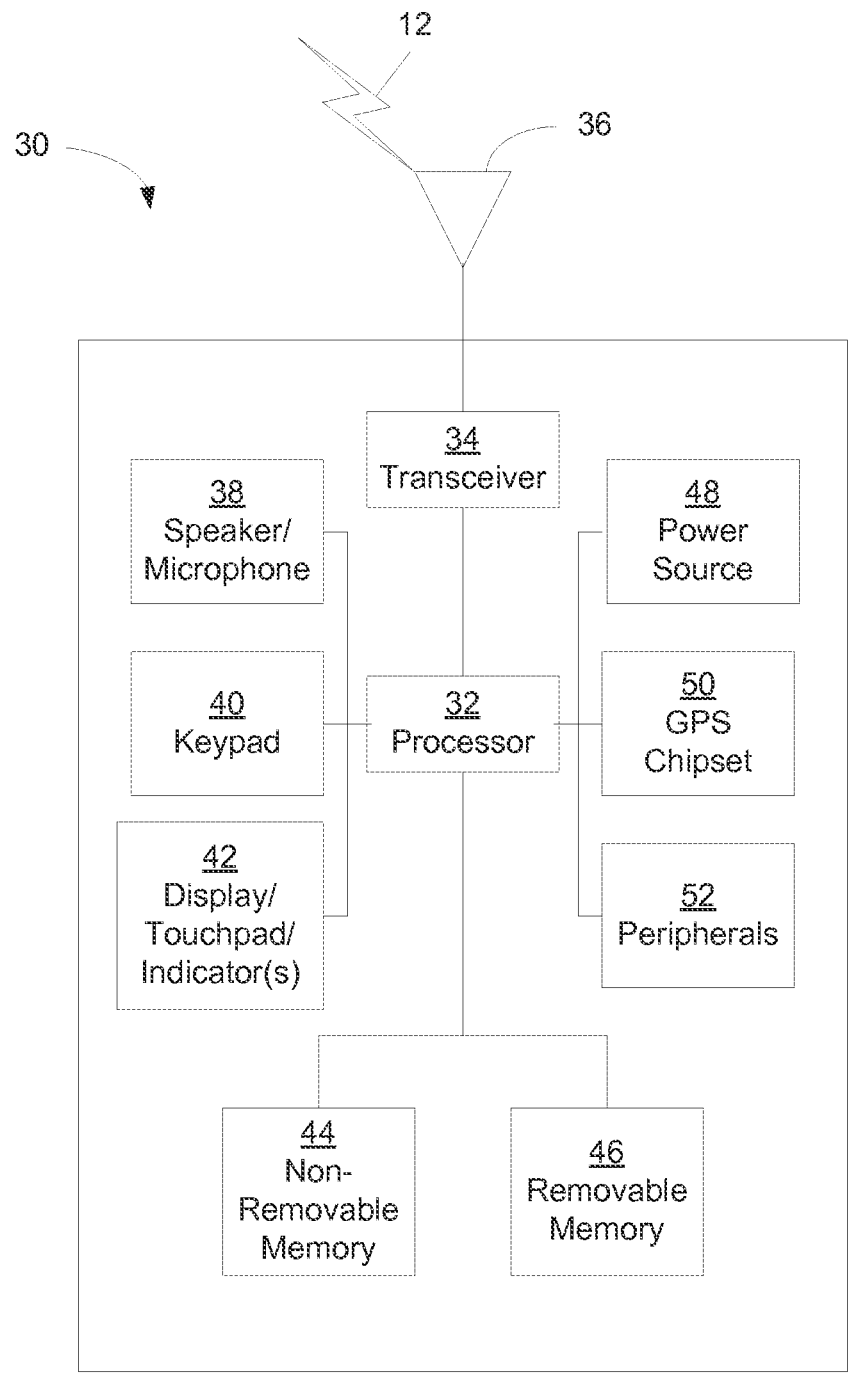
FIG. 23C is a system diagram of an example M2M/IoT terminal or gateway device that may be used within the communications system illustrated in FIG. 23A.
Figure 23D:
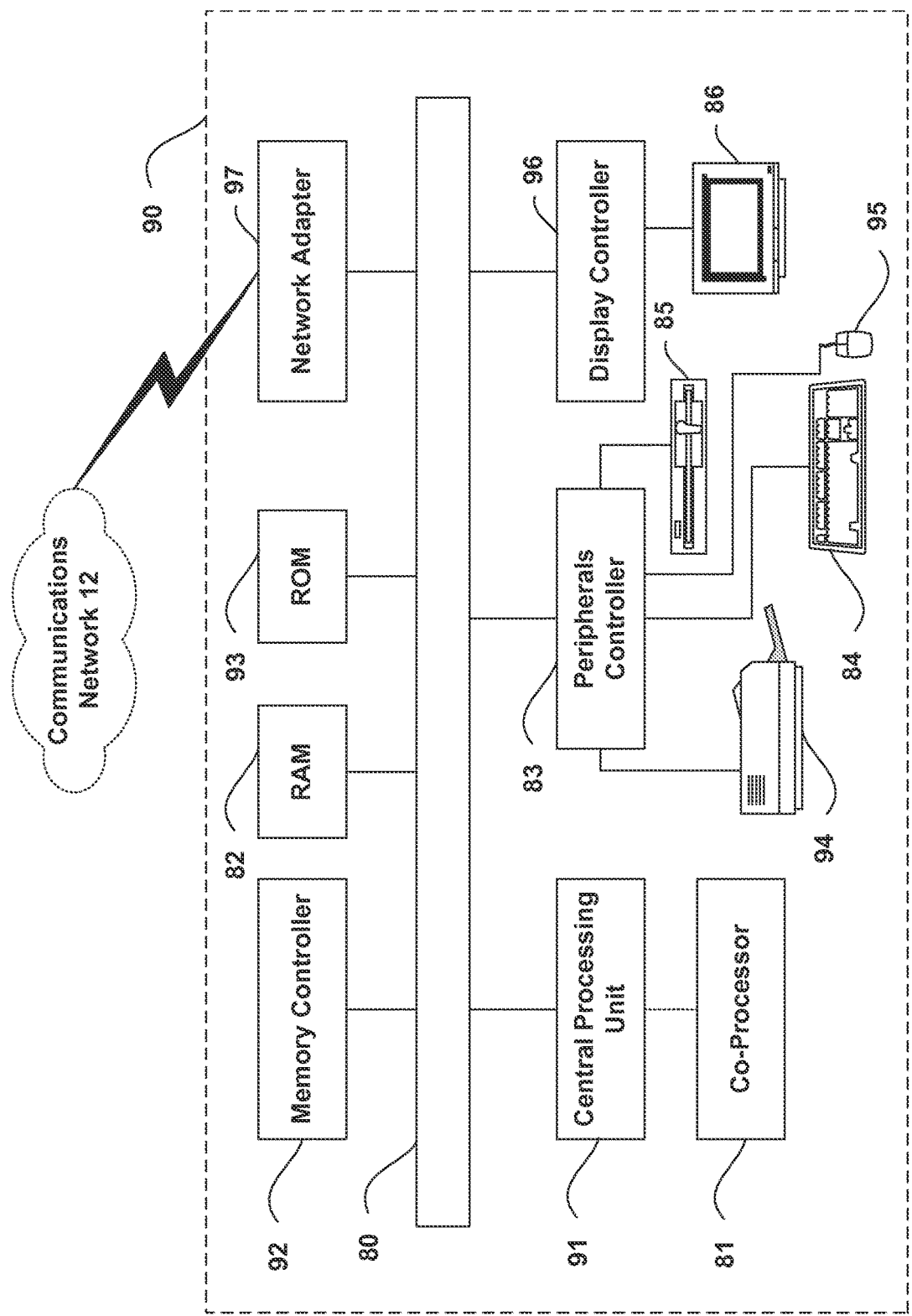
FIG. 23D is a block diagram of an example computing system in which aspects of the communication system of FIG. 23A may be embodied.

It is understood that the entities performing the steps illustrated in FIG. 6 are logical entities that may be implemented in the form of software (i.e., computer-executable instructions) stored in a memory of, and executing on a processor of, a device, server, or other computer system such as one of those illustrated in FIG. 23C or 23D. That is, the method(s) illustrated in FIG. 7 may be implemented in the form of software (i.e., computer-executable instructions) stored in a memory of a computing device, such as for example the device or computer system illustrated in FIG. 23C or 23D, which computer executable instructions, when executed by a processor of the computing device, perform the steps illustrated in FIG. 6. It is also understood that any transmitting and receiving steps illustrated in FIG. 7 may be performed by communication circuitry of the node under control of the processor of the node and the computer-executable instructions (e.g., software) that it executes.

Table 1 below illustrates exemplary service descriptions of the two example services shown in FIG. 1 and FIG. 2.

TABLE 1

Exemplary Service Descriptions

| Service Identifier | Service Nodes | Service Scope |
|---|---|---|
| motionSensehome1 FIG. 1 | sensor 1, 2, 3, 4 | Provides the motion sensing service of the entire home |
| smartGridReading FIG. 2 | service node 1, 2, 3 | Provides the smart grid reading service of the specified community. |

The service coverage recording component of an SCM 402 may manage the service coverage of all service nodes for a service. A service node may notify its service coverage to the SCM 402 by sending the service coverage report message. The service coverage report may be sent when the service node starts the service or the service coverage changes. Additionally, nodes may provide the SCM 402 with service coverage reports that pertain to other nodes. For example, an observer node may observe and/or measure a radio frequency (RF) signal that is emitted from a service node. The observer node may provide the SCM 402 with a report that details the observed strength and/or quality of the service node's signal at the observer node's location. The SCM 402 can then use this information to determine the coverage area of the observed service node. A node simultaneously may be a service node and an observer node. In another example, a node that wishes to use a service (i.e., a service client) may report to the SCM 402 that it desires to use a service and it presently detects no nodes offering the service in its area.

Figure 7:
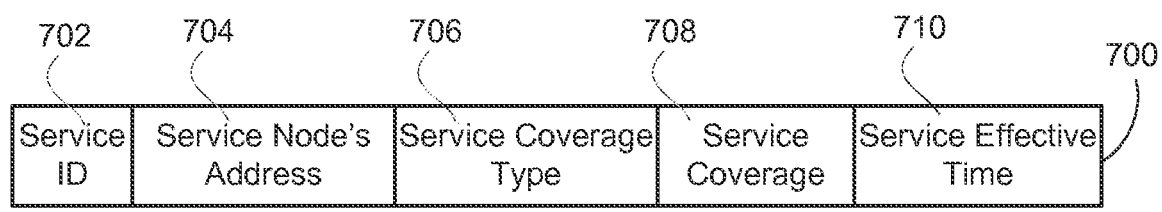
FIG. 7 is a diagram that illustrates an exemplary non-limiting service coverage report message.

The service coverage report message may have a structure such as exemplary non-limiting structure 700 shown in FIG. 7. Service ID 702 may represent the identifier of the service that the service node provides. The service node's address 704 may be used to address the service node. The service coverage type 706 may be as described by the following fields, but is not limited to them. Any combination of these fields may be used, in any combination with any other fields. This allows for multiple service coverage types and corresponding service coverage for a service node:

- Geographic region (GR): May be represented in different kinds of forms, for example, a circle with a specified diameter having a center at the service node, the specific room where the service node is located, specific address, etc. When the service coverage type is set to be a geographic region, the corresponding service coverage field in the service coverage report message may contain the representation in one of the exemplary forms.
- Client list (CL): May contain a list of individual clients to which the service node is willing to provide service. When the service coverage type is set to be a client list, the corresponding service coverage field in the service coverage report message may contain identifiers of clients that are authorized and being served by the service node.
- Access rule (AR): May denote a rule for accessing the service node's service. Only clients that satisfy the rule are allowed by the service node. For example, the rule may be any houses that are more than 3000 square feet or users with a certain type of authority. When the service coverage type is set to be an access rule, the corresponding service coverage field in the service coverage report message may contain the rule that the service node specifies.
- Observed Coverage (OC): Information provided by an observer node that pertains to the coverage that is provided by another service node. For example, the observed signal stretch of a motion detector's RF signal at a particular location and time.

The service coverage 708 is set up accordingly with the service coverage type. A service node may only provide the service coverage during certain time period, which may be represented in the Service Effective Time field 710 in message 700 shown in FIG. 7. By default, it is assumed to be on all the time.

Figure 8:
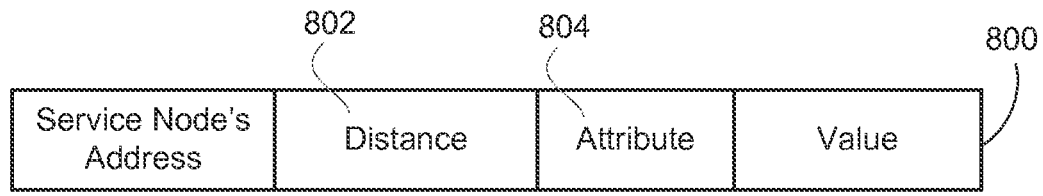
FIG. 8 is a diagram that illustrates an exemplary non-limiting service report message.

A service report message by an observer node may be different from a service report message by a service node. An exemplary non-limiting service report message 800 by an observer node is illustrated in FIG. 8. The distance field 802 may denote a distance between the service node and the observer node. The attribute field 804 may denote the attribute of the service node that the observer node observes. The value field 806 may denote the observed value of the attribute. For example, the observer node may observe the quality of the signal strength at its location of the service node. The service coverage report message 800 sent by an observer node may not be useful to an SCM 402 to analyze the service coverage of that service node.

In the example shown in FIG. 1, motion sensors are the service nodes of the motion sensing service in the home. The motion sensors may send a service coverage report to the SCM 402 as shown in exemplary non-limiting signal flow 900 of FIG. 9. The service coverage type may be GR. On the other hand, the SCM 402 may proactively request the motion sensors to provide such information as illustrated in exemplary non-limiting signal flow 1000 of FIG. 10. In the service coverage request message, the SCM 402 may include the service identifier and the service node's identifier. In the service coverage response message, the motion sensor can follow the same structure as the service report message. However, the service identifier and service node's identifier may be excluded from the service coverage response message as shown in FIG. 10 (i.e., the service identifier and service node's identifier does not need to be echoed in the service coverage response message). Therefore, after the service coverage report or request procedures between the motion sensors and the SCM 402, the SCM 402 may have the records of the service coverage as shown below in Table 2.

TABLE 2

Exemplary Service Coverage Record for Motion Sensing Service in the Home

| Service | Service Node | Service Coverage Type | Service Coverage | Service Effective Time |
|---|---|---|---|---|
| motionSensehome1 | sensor1 102 | GR | Family Room & Kitchen | Always on |
|  | sensor2 104 | GR | Kitchen & Living Room | Always on |
|  | sensor3 106 | GR | Master Bedroom & Bedroom 2 | Always on |
|  | sensor4 108 | GR | Bedroom 1 & Bedroom 2 | Always on |

Figure 9:
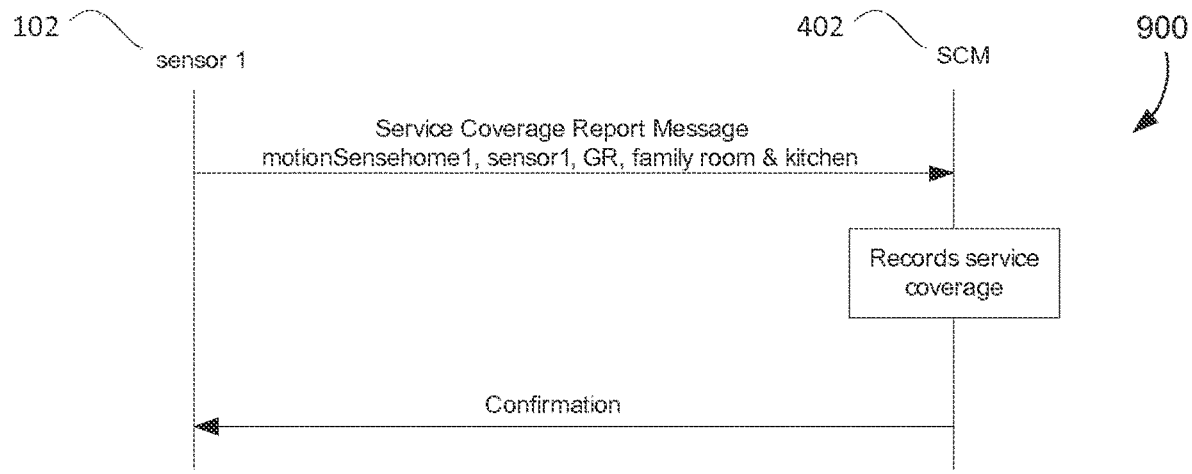
FIG. 9 is a diagram that illustrates an exemplary non-limiting signal flow for the motion sensors sending a service coverage report to the SCM
Figure 10:
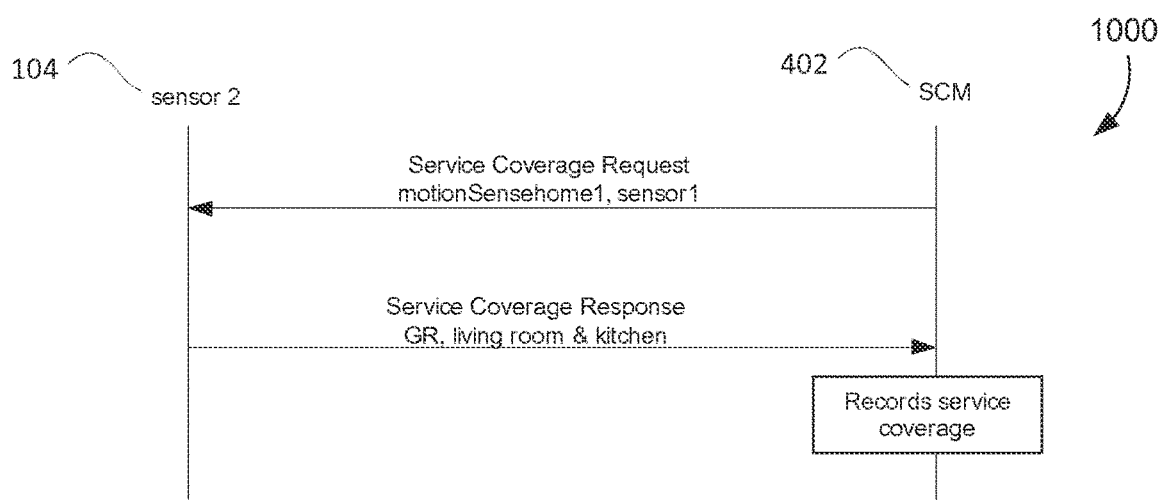
FIG. 10 is a diagram that illustrates an exemplary non-limiting signal flow for the SCM proactively request the motion sensors to provide information.

It is understood that the entities performing the steps illustrated in FIGS. 9-10 are logical entities that may be implemented in the form of software (i.e., computer-executable instructions) stored in a memory of, and executing on a processor of, a device, server, or other computer system such as one of those illustrated in FIG. 23C or 23D. That is, the method(s) illustrated in FIGS. 9-10 may be implemented in the form of software (i.e., computer-executable instructions) stored in a memory of a computing device, such as for example the device or computer system illustrated in FIG. 23C or 23D, which computer executable instructions, when executed by a processor of the computing device, perform the steps illustrated in FIGS. 9-10. It is also understood that any transmitting and receiving steps illustrated in FIGS. 9-10 may be performed by communication circuitry of the node under control of the processor of the node and the computer-executable instructions (e.g., software) that it executes.

In the example shown in FIG. 2, a smart meter reading service may have the service node 1 202, service node 2 204, service node 3 206. The service nodes 202, 204 and 206 may send service coverage reports to the SCM 402 as shown in exemplary non-limiting signal flow 1100 of FIG. 11. The service coverage type is AR. Alternatively, the SCM 402 can proactively request the service nodes to provide such information as shown in exemplary non-limiting signal flow 1200 of FIG. 12. Therefore, after the service coverage report or request procedures between the service nodes 202, 204, and 206 and the SCM 402, the SCM 402 may have the records of the service coverage as shown below in Table 3.

TABLE 3

Exemplary Service Coverage Record for Smart Grid Reading Service

| Service | Service Node | Service Coverage Type | Service Coverage Type | Service Effective Time |
|---|---|---|---|---|
| smartGridReading | 1 202 | AR | Size from 2000-3000 sqft | Always on |
| | 2 204 | AR | Built by a certain builder | Always on |
| | 3 206 | AR | Selling price is less than 1 Million | Always on |

Figure 11:
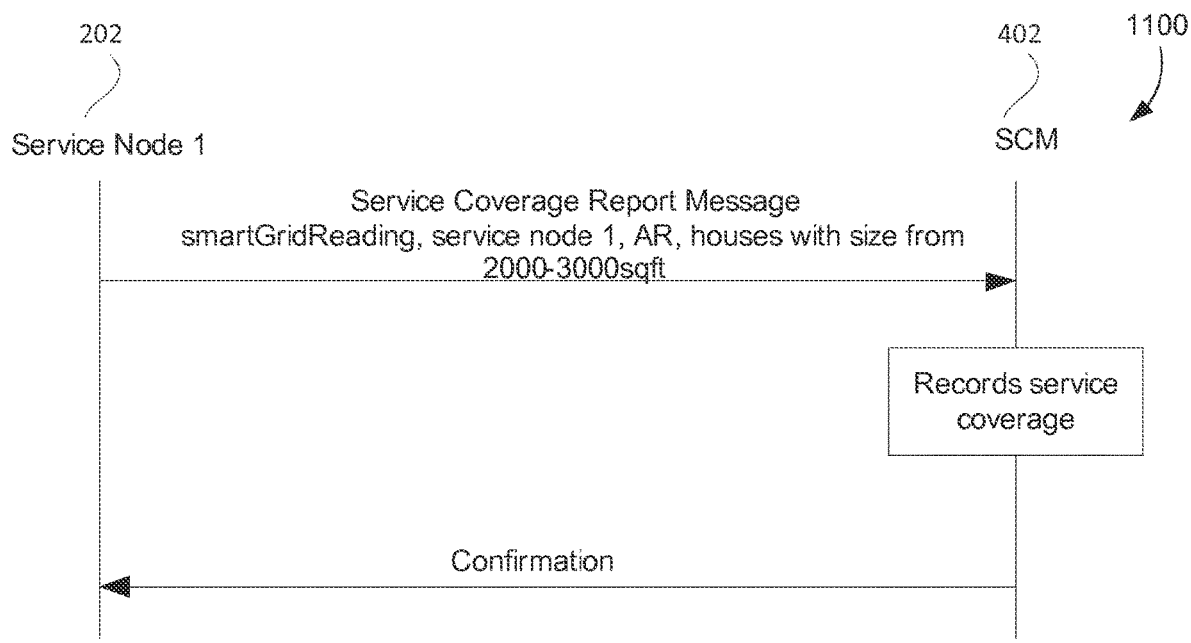
FIG. 11 is a diagram that illustrates an exemplary non-limiting signal flow for the service nodes sending service coverage reports to the SCM.
Figure 12:
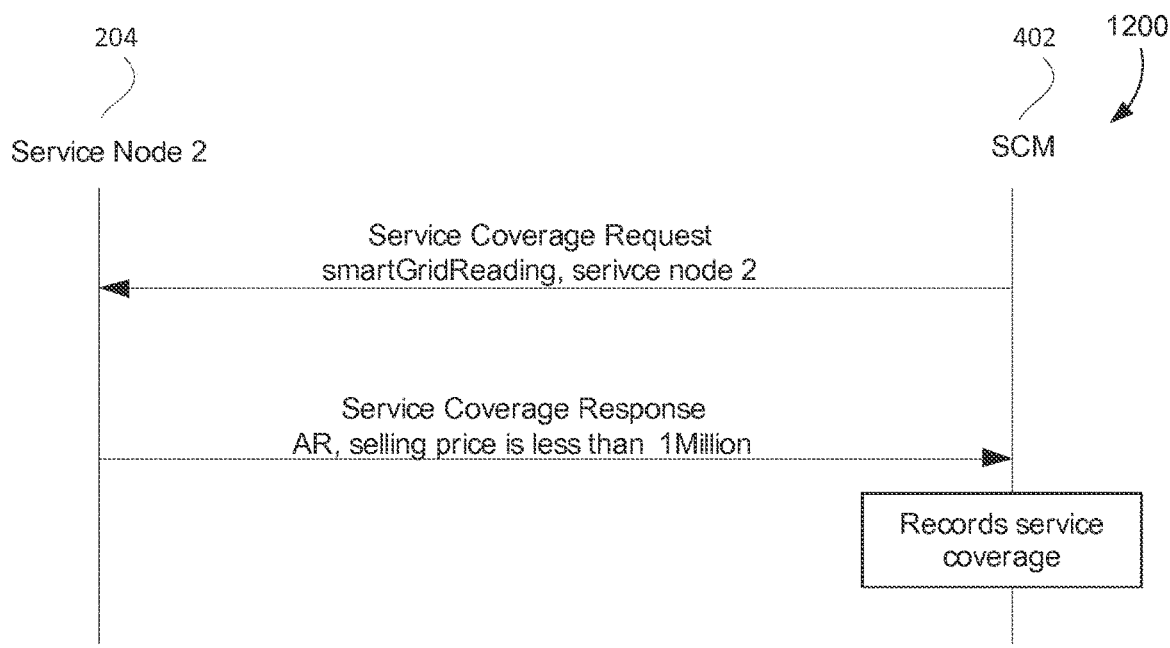
FIG. 12 is a diagram that illustrates an exemplary non-limiting signal flow where the SCM proactively request the service nodes provide information.

It is understood that the entities performing the steps illustrated in FIGS. 11-12 are logical entities that may be implemented in the form of software (i.e., computer-executable instructions) stored in a memory of, and executing on a processor of, a device, server, or other computer system such as one of those illustrated in FIG. 23C or 23D. That is, the method(s) illustrated in FIGS. 11-12 may be implemented in the form of software (i.e., computer-executable instructions) stored in a memory of a computing device, such as for example the device or computer system illustrated in FIG. 23C or 23D, which computer executable instructions, when executed by a processor of the computing device, perform the steps illustrated in FIGS. 11-12. It is also understood that any transmitting and receiving steps illustrated in FIGS. 11-12 may be performed by communication circuitry of the node under control of the processor of the node and the computer-executable instructions (e.g., software) that it executes.

The service coverage processing component may interpret the service coverage of all service nodes and generate a global picture of the service coverage for a service. For example, in the example of FIG. 1, the SCM 402 may determine that sensor 1 102, sensor 2 104, sensor 3 106, sensor 4 108 can provide the motion sensing service for the entire home and that there is coverage overlapping between sensor 1 102 and sensor 2 104 and between sensor 3 106 and sensor 4 108. In the of FIG. 2, the SCM 402 is able to know that the service nodes 202, 204 and 206 have coverage overlapping as shown in FIG. 2 because some of the houses in the community satisfy more than one of the rules.

The SCM 402 may also determine whether the available service nodes for a particular service can reach the service scope. For example, in the example of FIG. 1, the service scope of the service identified as "motionSensehome1" (see also Table 1) may be to provide motion sensing service for the entire home. Since the service nodes (sensors 102, 104, 106 and 108) can fully cover the home, the SCM 402 may determine that their service coverage reaches the service scope. In the example of FIG. 2, the service scope of the service identified as "smartGridReading" (see also Table 1) may be to provide the smart grid reading service of the specified community. It is possible there is a house in the community, which is neither with size of 2000-3000 square feet nor built by the builder, and without a selling price of less than 1 million. As a result, the service nodes' service coverage may not be able to reach the service scope. The service coverage processing component may provide the necessary information of the service coverage for the adjustment component introduced below.

The service coverage adjustment component 416 may adapt the service nodes' service coverage based on the clients' service requests and the information fed from the processing component. Note that other entities, such as a policy manager, may provide policies to the SCM 402 to make service coverage adjustments. The SCM 402 may also detect a pattern from the service requests from clients. Instead of adjusting the service coverage for the current service, the new service may be formulated or generated with appropriate service coverage to satisfy the clients' requests.

The SCM 402 may dynamically adjust the service nodes' coverage to accommodate the clients' service requests in several situations. For example, if there is overlap in the service coverage between two service nodes, one of the service nodes' service coverage may be reduced. If there is no client or a small number of clients requesting a service in a certain coverage for a period of time, the corresponding service node's service coverage may be reduced. If there are a large number of requesters in a certain coverage such that the service node is not able to provide the required quality of service, the service coverage of other service nodes (e.g., adjacent geographically) may be enlarged to cover that area and some of the clients may be transferred to the expanded coverage service nodes. If there are clients that are not covered by any service node, the SCM 402 may select other service nodes and adjust their service coverage to allow such uncovered clients to receive service based on the service nodes' context information, (e.g., location, load, etc.) Additional details about these embodiments are set forth herein.

An SCM 402 may detect service coverage overlap after the service coverage processing described above. In order to avoid wasting unnecessary resources of multiple service nodes in providing the same service in the same coverage, the SCM 402 can coordinate the service nodes in adjusting its service coverage. For example, referring again to FIG. 1, the SCM 402 already knows that both sensor 1 102 and sensor 2 104 cover the kitchen and that both sensor 3 106 and sensor 4 108 covers bedroom 2. The SCM 402 may notify sensor 1 102 and/or sensor 2 104 to reduce its signal strength and adjust its lens angle such that the overlap in the kitchen area can be eliminated or reduced. Similarly, the SCM 402 may also notify sensor 3 106 and/or sensor 4 108 to reduce its signal strength and adjust its lens angle such that the overlap in bedroom 2 can be eliminated or reduced.

Figure 13:
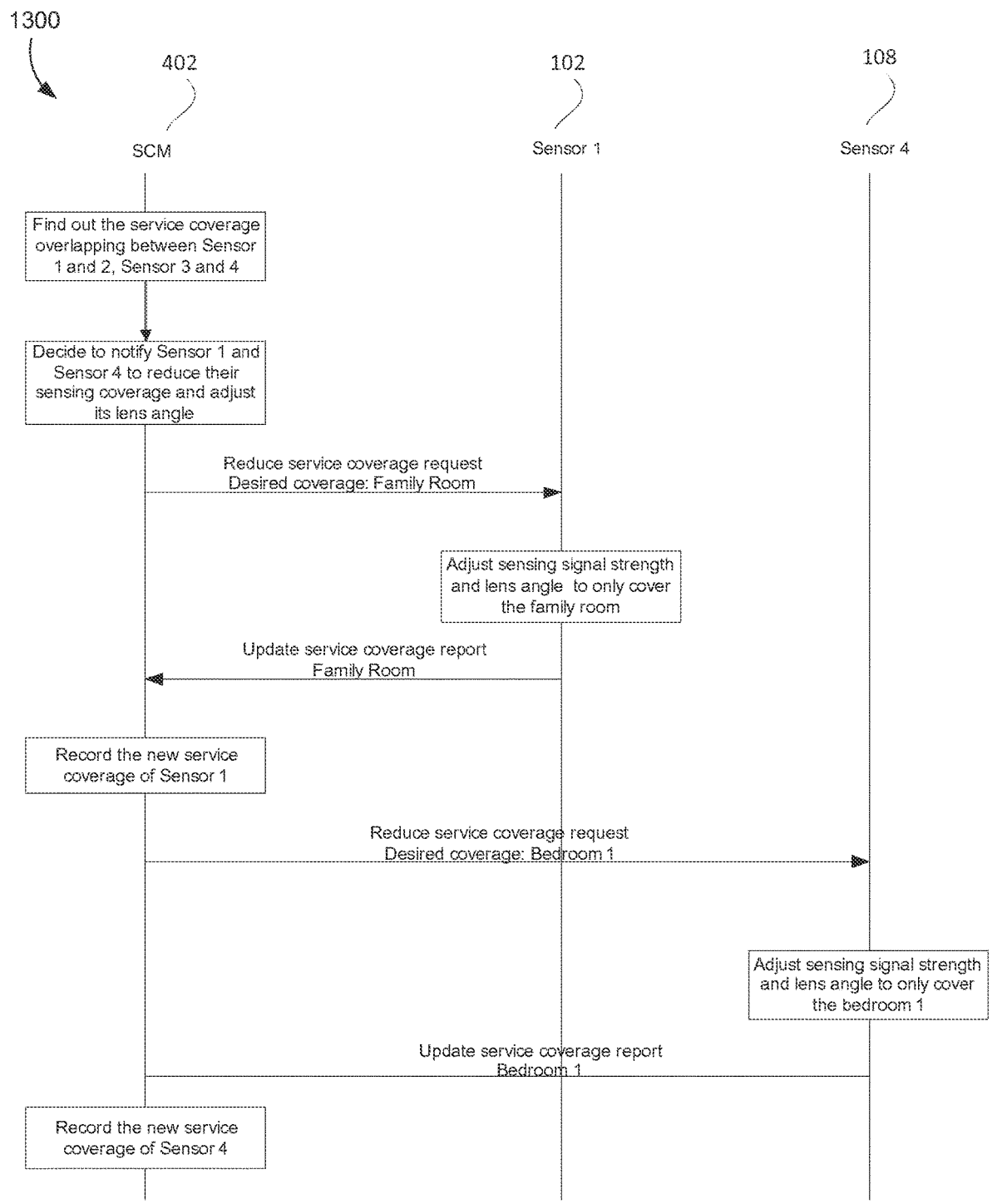
FIG. 13 is a flow diagram that illustrates shows an exemplary non-limiting message flow of a service coverage adjustment initiated by the SCM to sensors.

FIG. 13 is a flow diagram that illustrates an exemplary non-limiting message flow 1300 of a service coverage adjustment initiated by the SCM to sensor 1 102 and sensor 4 104. In the service coverage request message, the SCM 402 may notify sensor 1 that the desired service coverage is the family room and/or notify sensor 4 that the desired service coverage is bedroom 1. Sensor 1 102 and/or sensor 4 106 may adjust their sensing signal strength to reduce the service coverage properly. They may also update the new service coverage to the SCM 402 as the confirmation to the SCM's adjustment request.

Figure 14:
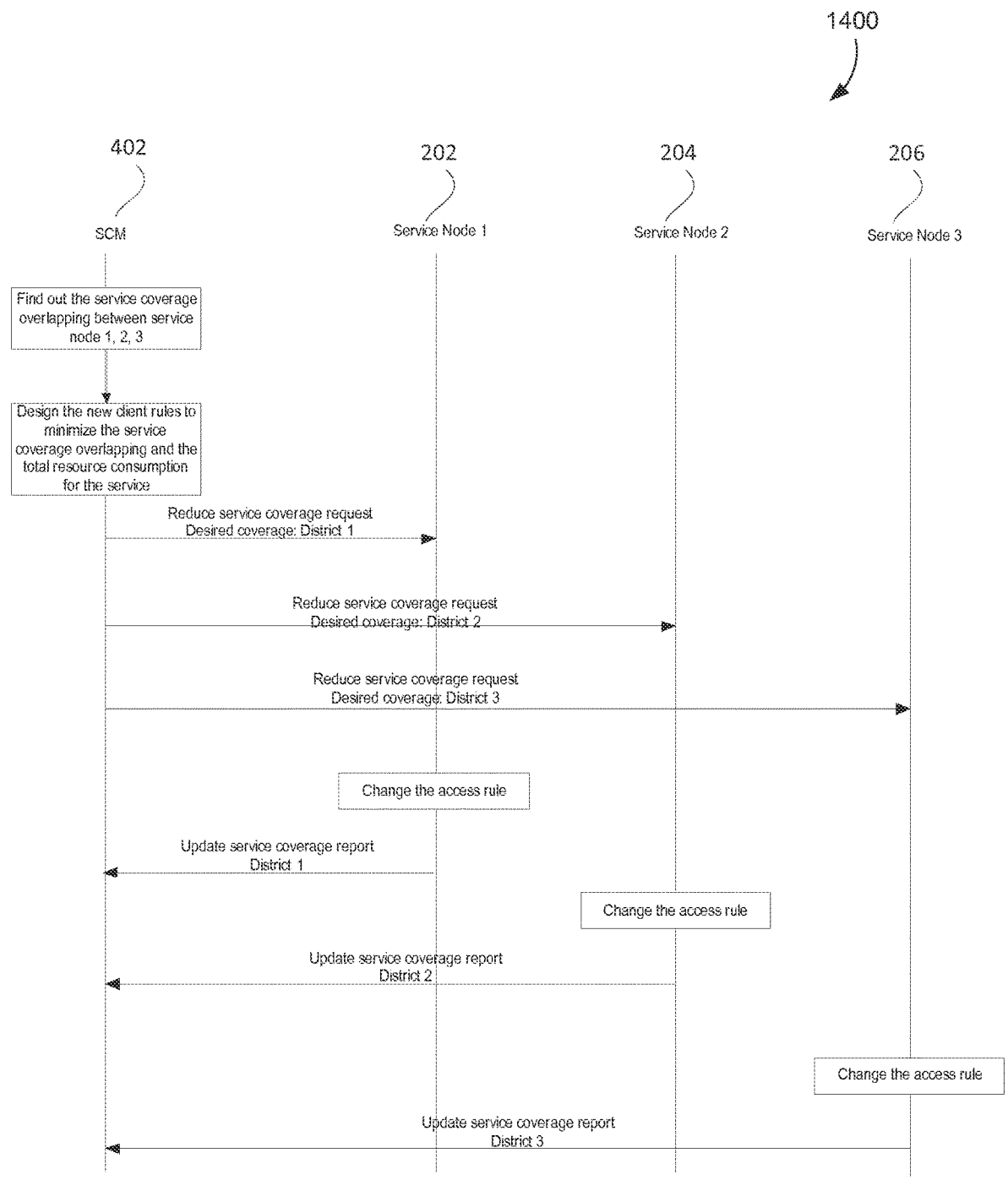
FIG. 14 is a diagram that illustrates exemplary non-limiting message flow 1400 of the service coverage adjustment initiated by the SCM to the service nodes.

In the example of FIG. 2, the SCM 402 may determine the overlap of service nodes' coverage areas from their access rules. There might be houses in the community that satisfy two or three access rules of the service nodes. As a result, there may be more than one service node that will serve those houses, which may not be desirable. FIG. 14 shows exemplary non-limiting message flow 1400 of the service coverage adjustment initiated by the SCM 402 to the service node 1 202, service node 2 204, and service node 3 206. The SCM 402 may design the access rule for each service node to coordinate the service nodes' service coverage to have less or minimal overlapping, while still satisfying the service scope. In order to achieve this, the SCM 402 may obtain knowledge of the potential service clients (e.g., houses located in the community) and their features (size, builder, selling price, address etc.). In one embodiment, the SCM 402 may divide the community into three districts (adjacent to each other but having no overlap geographically), each of which is assigned to one service node. As a result, service node 1's new access rule includes the houses in District 1, while service node 2's new access rule includes the houses in District 2 and service node 3's new access rule includes the houses in District 3. Each service node may also adapt its resources to serve the clients. The total resources to provide the smart grid reading service to this community may be largely reduced.

Figure 15:
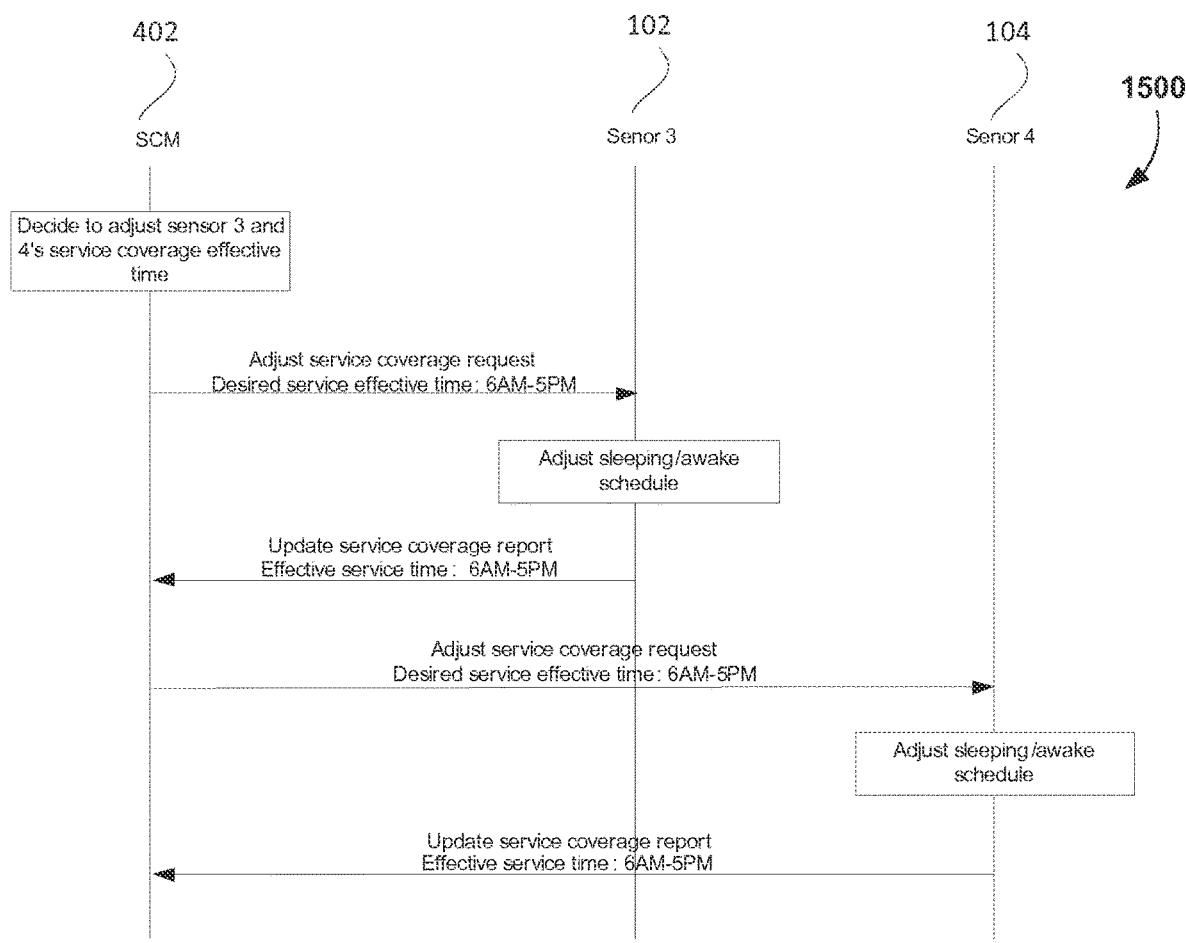
FIG. 15 is a diagram that illustrates an exemplary non-limiting message flow that demonstrates the SCM adjusting a service coverage effective time of a sensor.

If there is no client or only a small number of clients requesting the service in certain coverage for some time, the SCM 402 may reduce the corresponding service node's service coverage. In the example of FIG. 1, the sensor may not need to sense motion while the room is occupied. For example, during the night time, it may be unnecessary to keep track of the motion in bedrooms. So sensor 3 106 and sensor 4 108 may only need to provide service coverage during day time. In this scenario, service coverage may be associated with an effective time period. The SCM 402 may adjust a service coverage effective time of sensor 3 106 and/or sensor 4 108. An exemplary non-limiting message flow 1500 that demonstrates such an embodiment is shown in FIG. 15.

Figure 16:
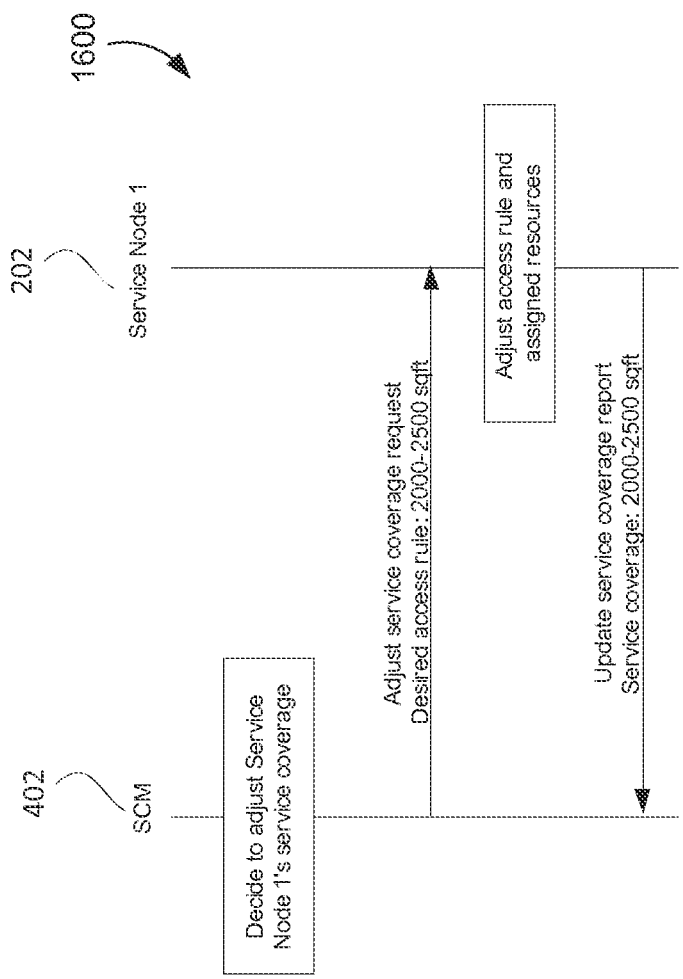
FIG. 16 is a diagram that illustrates an exemplary non-limiting message flow where the SCM notifies the service node to change an access rule.

In the example of FIG. 2, the service coverage adjustment component 416 of the SCM 402 may be able to determine the clients served by each service node from the smart grid reading data reported. The SCM 402 may notice that service node 1 202 only reports the smart grid reading from a very small number of houses because the houses' sizes are actually between 2000 and 2500 square feet. However, service node 1 202 may be configured and deployed with the resources (for data collecting, data processing, etc.) to serve a large number of houses. In order to save the unused resource, the SCM 402 may notify the service node 202 to change the access rule to be houses with sizes between 2000 and 2500 square feet. An exemplary non-limiting message flow 1600 that demonstrates such an embodiment is shown in FIG. 16.

It is understood that the entities performing the steps illustrated in FIGS. 13-16 are logical entities that may be implemented in the form of software (i.e., computer-executable instructions) stored in a memory of, and executing on a processor of, a device, server, or other computer system such as one of those illustrated in FIG. 23C or 23D. That is, the method(s) illustrated in FIGS. 13-16 may be implemented in the form of software (i.e., computer-executable instructions) stored in a memory of a computing device, such as for example the device or computer system illustrated in FIG. 23C or 23D, which computer executable instructions, when executed by a processor of the computing device, perform the steps illustrated in FIGS. 13-16. It is also understood that any transmitting and receiving steps illustrated in FIGS. 13-16 may be performed by communication circuitry of the node under control of the processor of the node and the computer-executable instructions (e.g., software) that it executes.

If there is such a large number of requesters in a certain coverage that the service node is not able to provide the required quality of service, the service coverage of other service nodes (e.g., adjacent geographically) may be enlarged to cover that area some of the requesting clients may be transferred to those service nodes. In the example of FIG. 1, it may be that sensor 1's power is running low and so it may not be able to keep track of the motion all the time. Sensor 1 102 may notify the SCM 402 of this context information. The SCM 402 may adjust the service coverage of sensor 3 106, which is adjacent to sensor 1 102 geographically. After the adjustment, sensor 3 106 may take over sensor 1's service coverage during the effective time period, while sensor 1 102 goes to sleep to save energy. An exemplary non-limiting message flow 1700 that demonstrates such an embodiment is shown in FIG. 17.

In the example of FIG. 2, there may be a large number of houses whose selling prices are below one million dollars that fall into the service coverage of service node 2 204. However, service node 2 204 may not be able to provide the proper quality of service to so many clients. The SCM 402 may adjust the access rules of service node 2 204 to take over some of the clients of service node 1 202. The service node's access rule may also be adjusted accordingly. As shown in exemplary non-limiting message 1800 of FIG. 18, the access rule of the service node 1 202 may be adjusted to "selling price below 850 k" and the access rule of service node 2 204 may be adjusted to "selling price between 850 k and 1 m, or size between 2000-3000 sqft".

If there are clients that are not covered by any service node, the SCM 402 may select other service nodes and adjust their service coverage to allow those clients to receive service based on the service nodes' context information (e.g., location, load, etc.) A service node may forward a client's service request to the SCM 402 if this client is not in its service coverage. The SCM 402 may determine any other service node that may be able to provide the service to the client. The decision may be made by considering factors such as the distance between the client and the service node, the service node current load, etc. The SCM 402 may then forward the client's request to the service node. After the service node confirms the addition of the client to its service coverage, the SCM 402 updates accordingly. If the SCM 402 is able to find a pattern of those uncovered clients, it may adjust the service nodes' service coverages to accommodate future clients with the same pattern. Exemplary non-limiting method 1900 of implementing such an embodiment is illustrated in FIG. 19.

Figure 17:
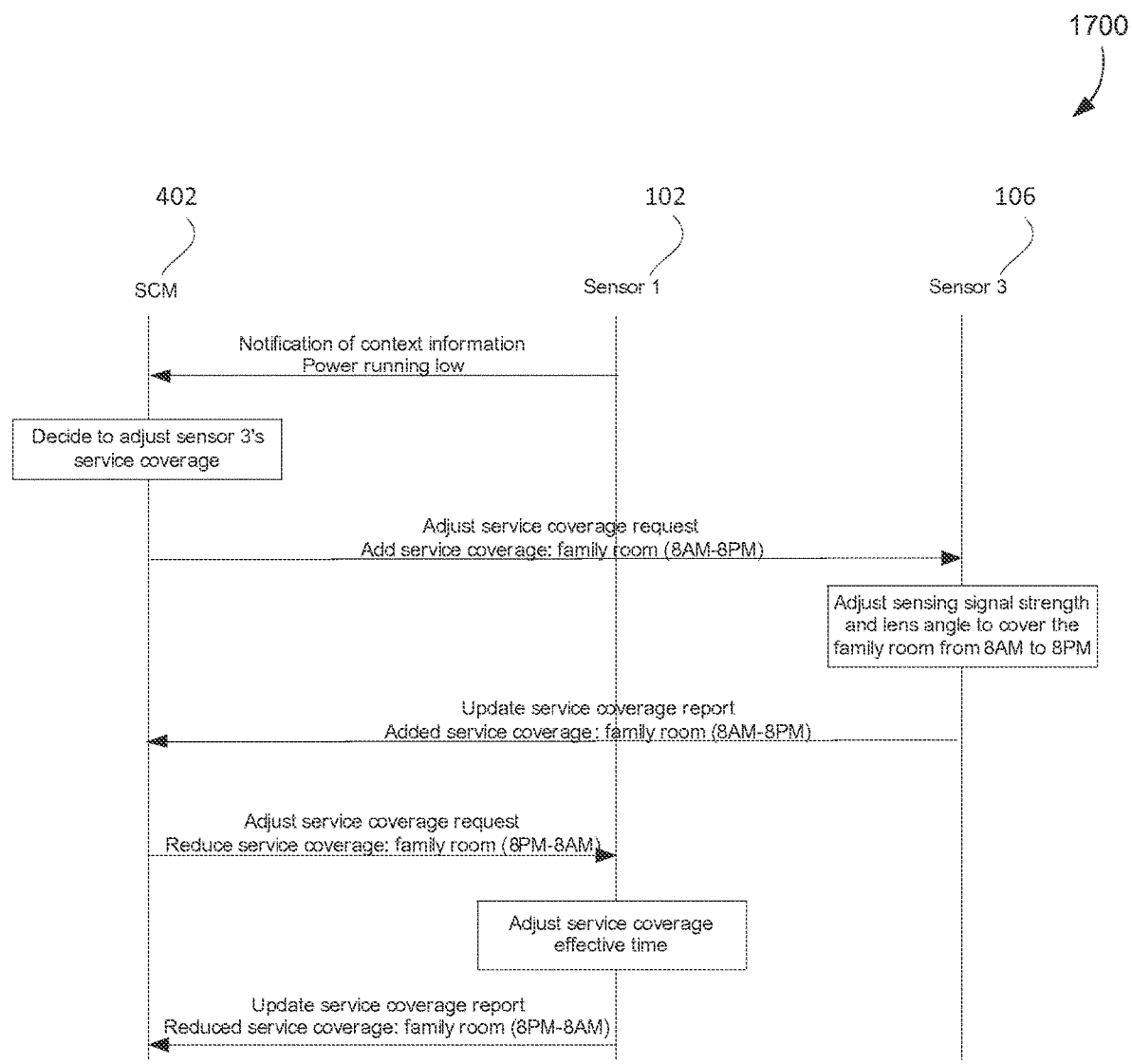
FIG. 17-19 are diagrams that illustrate exemplary non-limiting message flows where a service coverage area is adjusted.
Figure 18:
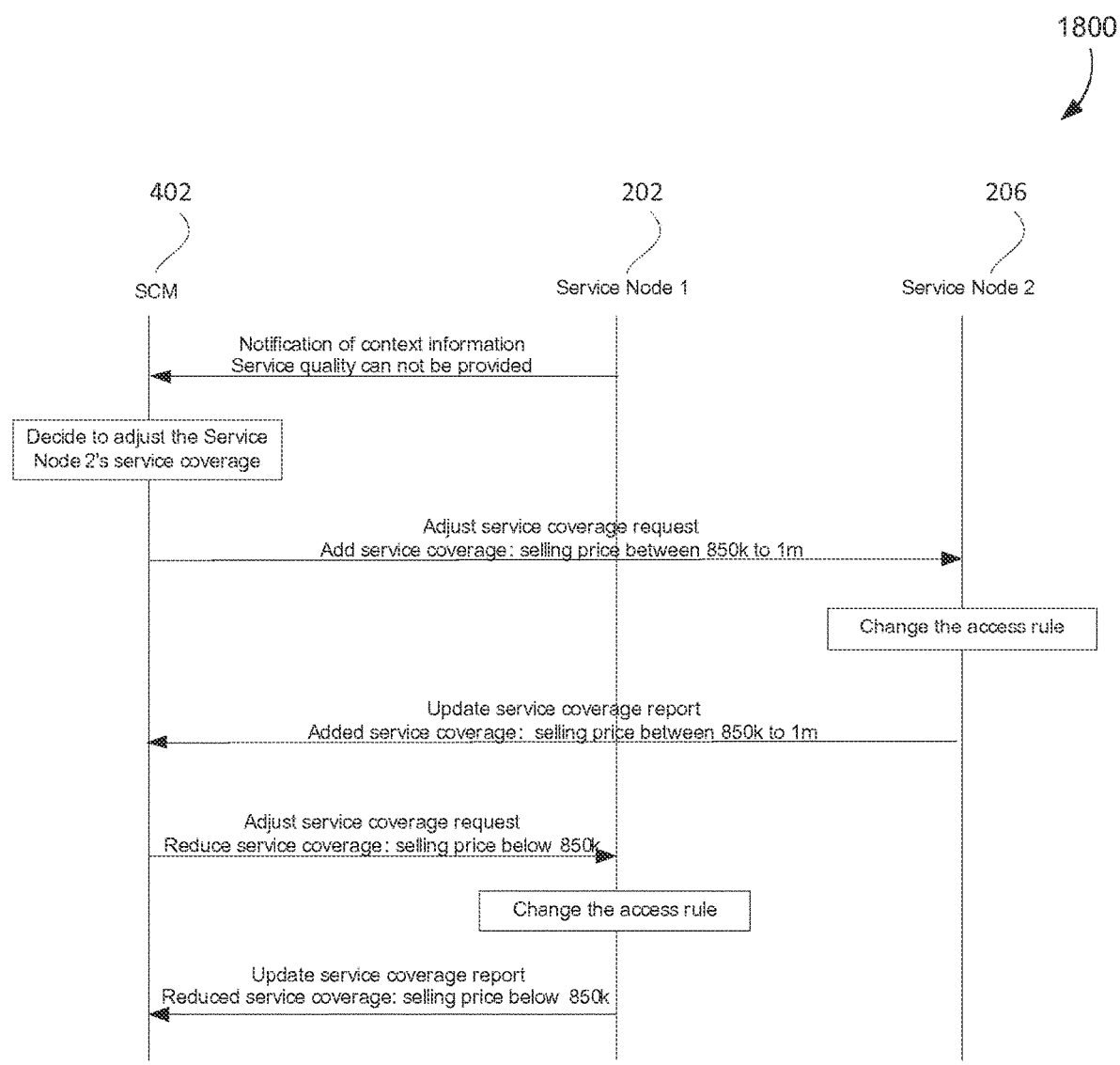
Figure 19:
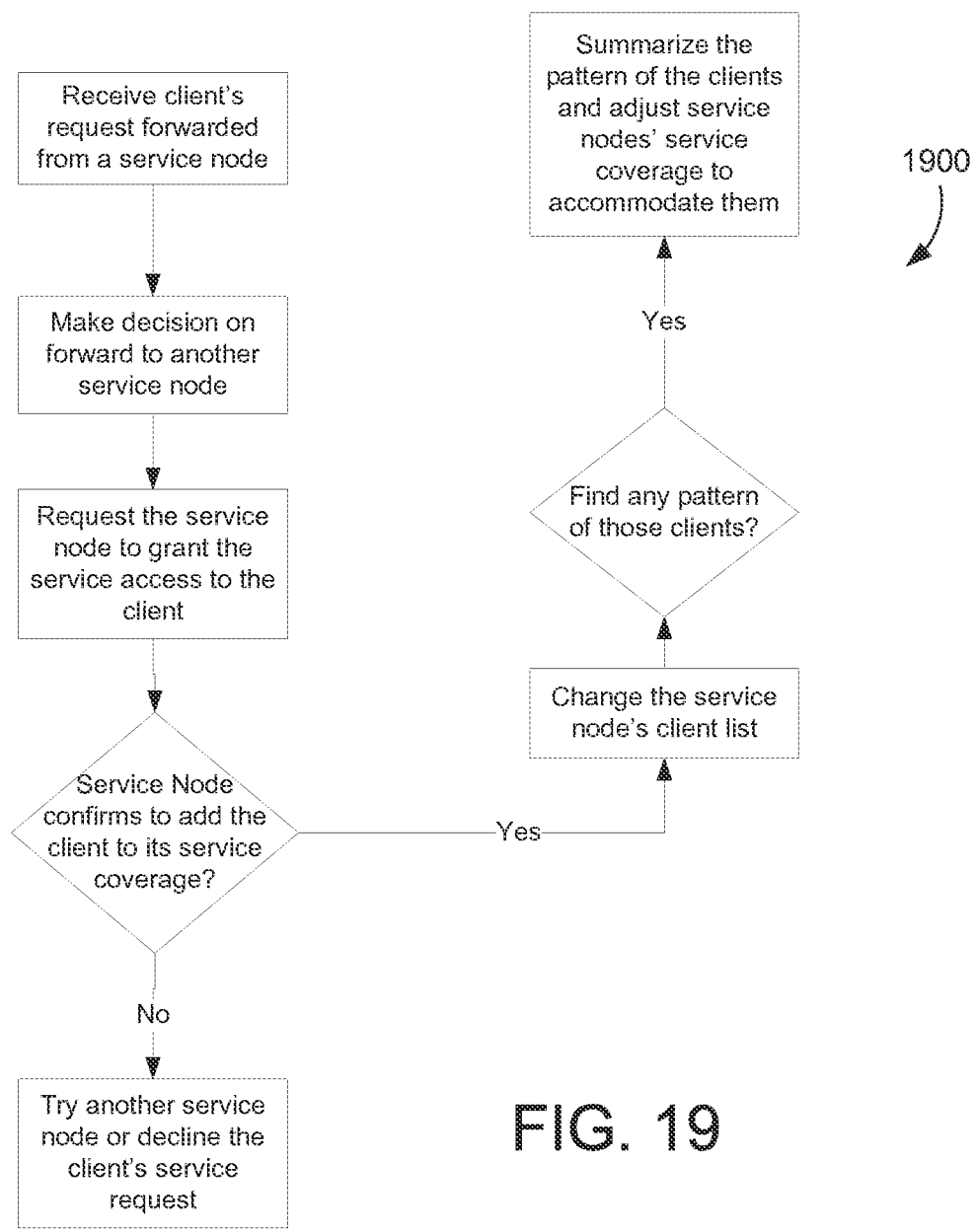

It is understood that the entities performing the steps illustrated in FIGS. 17-19 may be logical entities that may be implemented in the form of software (i.e., computer-executable instructions) stored in a memory of, and executing on a processor of, a device, server, or other computer system such as one of those illustrated in FIG. 23C or 23D. That is, the method(s) illustrated in FIGS. 17-19 may be implemented in the form of software (i.e., computer-executable instructions) stored in a memory of a computing device, such as for example the device or computer system illustrated in FIG. 23C or 23D, which computer executable instructions, when executed by a processor of the computing device, perform the steps illustrated in FIGS. 17-19. It is also understood that any transmitting and receiving steps illustrated in FIGS. 17-19 may be performed by communication circuitry of the node under control of the processor of the node and the computer-executable instructions (e.g., software) that it executes.

In the example of FIG. 2, service node 1 202, service node 2 204 and service node 3 206 may receive clients' requests, for services that they do not provide because the requesting clients do not satisfy their access rules. Those clients' requests may be forwarded to the SCM 402, which in turn may choose one of the three service nodes to carry out the smart grid reading service for those houses. Initially, each such house may be added to the client list of the service node individually. After the SCM 402 detects a pattern of such clients (e.g., houses having selling prices over 1 m), an access rule may be modified or added to service coverage of one or more service nodes.

Disclosed hereinafter are embodiments in which are implemented in a network that operates in accordance with the oneM2M architecture. As mentioned above, oneM2M is defining capabilities supported by the oneM2M service layer. These capabilities are referred to as Capability Service Functions (CSFs). The oneM2M service layer is referred to as a Capability Services Entity (CSE). As shown in FIG. 3B, a CSE 302 supports a set of CSFs. In one embodiment, the CSE 302 may be a modified version of the CSE 302 illustrated in FIG. 3B and described above, and the set of CSFs likewise may be a modified version of the CSFs in FIG. 3B and also described above.

Figure 20:
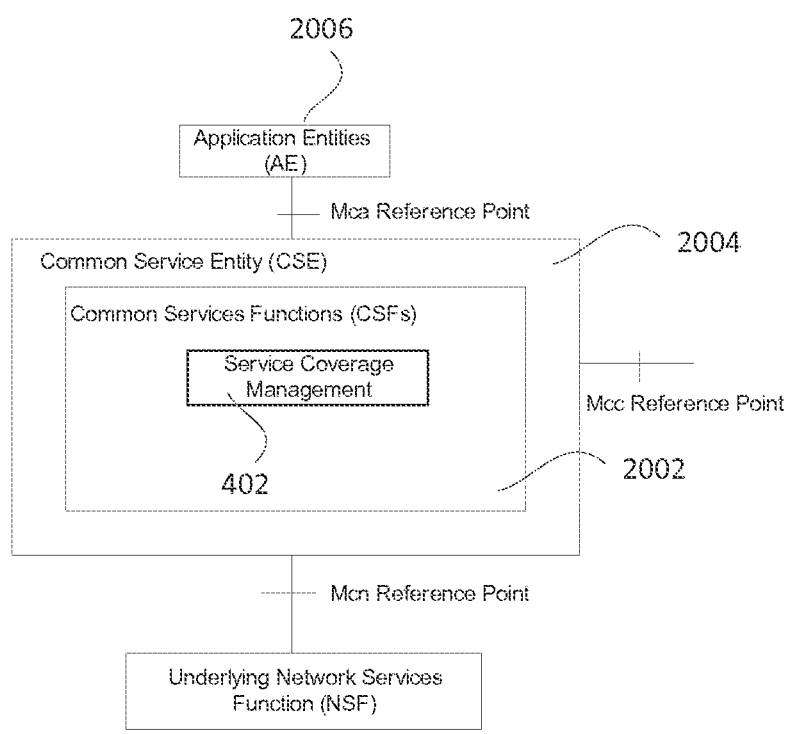
FIG. 20 is a diagram that illustrates the proposed service coverage manager (SCM) hosted in the Service Coverage Management as an oneM2M CSF.

FIG. 20 illustrates the proposed service coverage manager (SCM) 402 hosted in the Service Coverage Management as an oneM2M CSF. oneM2M defines the capabilities supported by the oneM2M service layer, which are referred to as Capability Service Functions (CSFs) 2002. The oneM2M service layer may be referred to as a Capability Services Entity (CSE) 2004. The service nodes may be M2M devices/gateways/servers hosting application entities or CSEs.

Application entities 2006 may provide coverage reports to the SCM 402 via the Mca reference point and the SCM 402 may send service coverage adjustments to the AE 2006 via the same Mca reference point.

CSEs 2004 may send coverage reports to SCMs that are hosted on other CSEs via the Mcc reference point and the SCM 402 may send service coverage adjustments to other CSEs via the same Mcc reference point.

Other CSFs in the CSE may need to be informed about changes to a particular node's service coverage. Thus, CSFs may subscribe to particular events in the SCM 402 and the SCM 402 may generate an event notification to the CSF when a particular event (e.g., a coverage change) occurs. Alternatively, a SCM 402 may proactively notify other CSFs of events without the other CSFs subscribing to the event.

Figure 21:
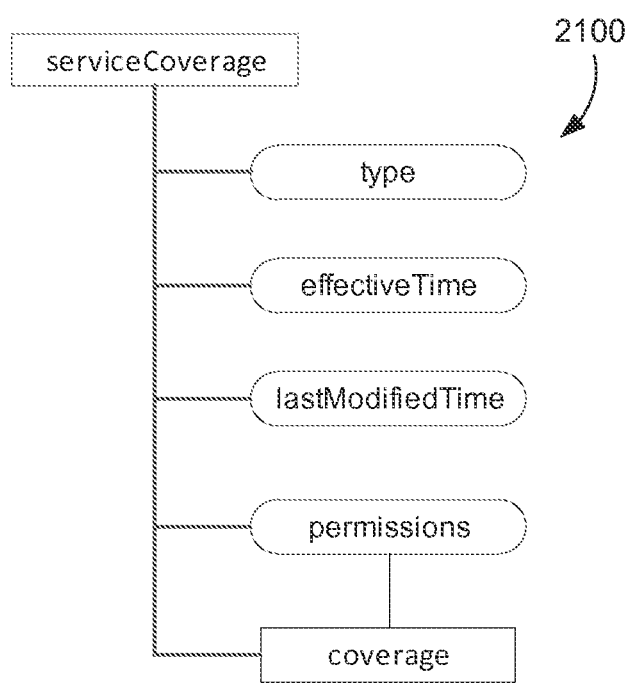
FIG. 21 illustrates an exemplary non-limiting embodiment of a service coverage record.

The SCM 402 may send messages to other CSEs to suggest or instruct other nodes to change from whom they obtain a service. The SCM 402 may be able to advertise to other CSFs or CSE's the services it is managing and the associated coverage that is associated with each node offering the service. The SCM 402 may be configured, in one embodiment by another management entity, to manage particular services and particular nodes. The SCM 402 may obtain node location information via the Mcn reference point. The location information may be used to determine the service area of a node or it may be used to determine what service node should serve a client. The SCM 402 may obtain information via the Mcn reference point and use the information to adjust service coverage areas. For example, the Mcn interface may provide input about the available bandwidth to/from a particular service node. The SCM 402 may use this information to make decisions about how many nodes can be serviced by the node. The SCM 402 may generate a charging data record (CDR) any time it receives a coverage report, adjusts a coverage area, or provides another CSF or CSE with service related information. The service coverage records may be maintained by the SCM 402 in the oneM2M service layer. FIG. 21 illustrates an exemplary non-limiting embodiment 2100 of a service coverage record. Table 4 below shows the attributes of the serviceCoverage resource of one embodiment.

TABLE 4

Exemplary serviceCoverage Resource Attributes

| AttributeName | Multi-plicity | RW/RO/WO | Description |
| --- | --- | --- | --- |
| type | 1 | RO | Specifies the type of the service coverage, it could be one of four defined in the disclosure: GA, CL, AR, OC. |
| effectiveTime | 1 | RO | Specifies the effective period of the service coverage. |
| lastModifiedTime | 1 | RO | Specifies when is the last time the service coverage was modified |
| permissions | 1 | RO | Specify the permissions granted to others in accessing the service coverage. |

Described above are messages and procedures of service coverage management based on service requests from users. The messages and procedures defined can be extended to provide a graphical user interface (GUI) for users. For example, the user may request service coverage of service hosts and choose service host based on the service coverage, e.g. using user interface menus, fields or forms displayed on a display, that are then sent to the SCM 402. Service coverage of service node may then be displayed on the device's user interface, which may have the format as shown in FIG. 7.

Figure 22A:
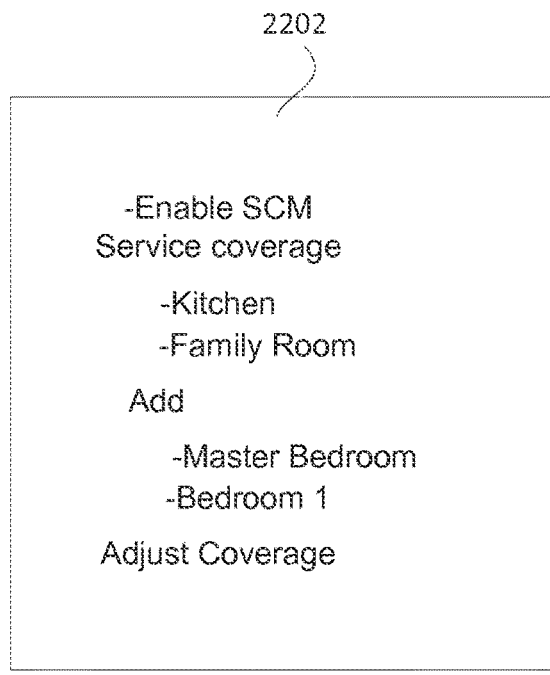
FIG. 22A is a diagram that illustrates an interface that allows the user to enable or disable the SCM, select the service coverage, add areas or service nodes and adjust the coverage.
Figure 22B:
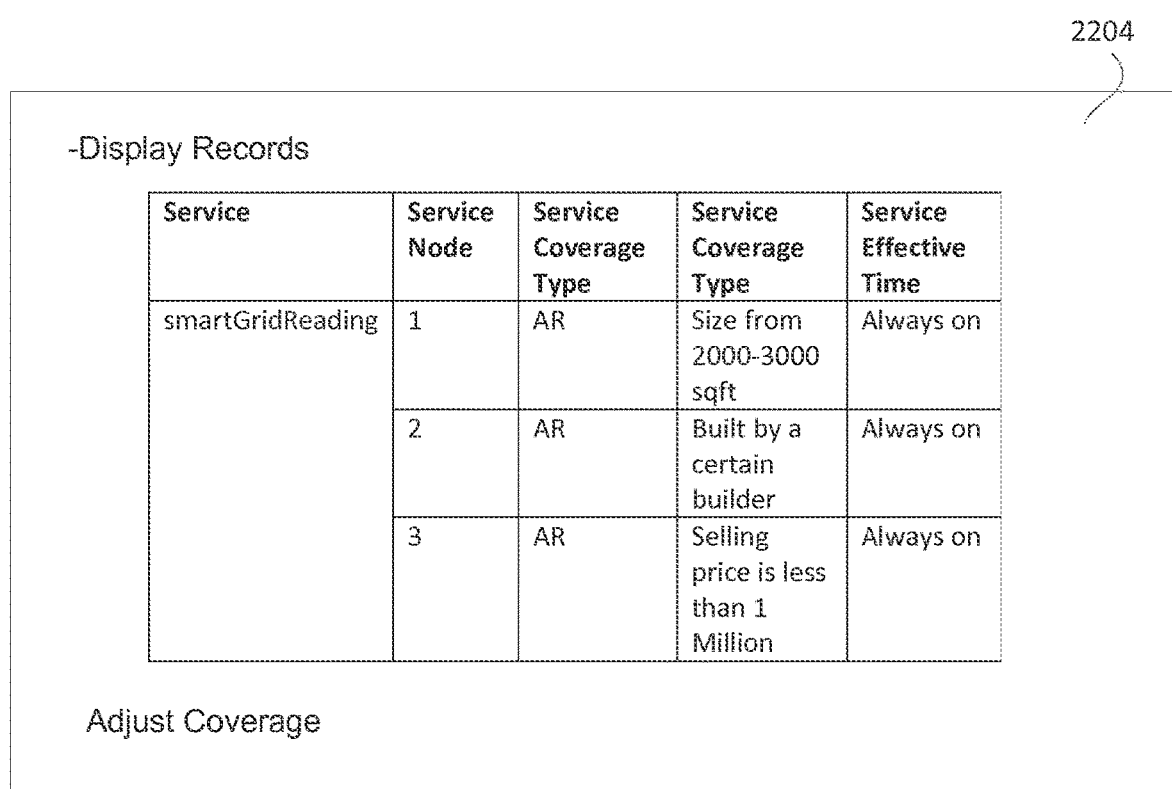
FIG. 22B is a diagram that illustrates an interface that displays details of service coverage.

Interfaces, such as graphical User Interfaces (GUIs), can be used to assist user to control and/or configure functionalities related to the SCM 402. FIG. 22A is a diagram that illustrates an interface 2202 that allows the user to enable or disable the SCM 402, select the service coverage, add areas of service nodes and adjust the coverage. FIG. 22B is a diagram that illustrates an interface 2204 that displays details of service coverage and can be used to update the service coverage. It is to be understood that interfaces 2202 and 2204 can be produced using displays such as those shown in FIGS. 23C-D described below.

Example M2M/IoT/WoT Communication System

FIG. 23A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204.

As shown in FIG. 23A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 23A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Exemplary M2M devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 23B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204. The M2M service layer 22 may be implemented by one or more servers, computers, devices, virtual machines (e.g. cloud/storage farms, etc.) or the like, including for example the devices illustrated in FIGS. 23C and 23D described below. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprises servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 23B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204 may be hosted within a M2M service layer instance hosted by an M2M node, such as an M2M server, M2M gateway, or M2M device, as shown in FIG. 23B. For example, the logical entities such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 23C or FIG. 23D described below.

Further, logical entities of the present application such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204 can implemented as part of an M2M network that uses a Service Oriented Architecture (SOA) and/or a Resource-Oriented Architecture (ROA) to access services of the present application.

FIG. 23C is a block diagram of an example hardware/software architecture of a M2M network node 30, such as an M2M device 18, an M2M gateway 14, an M2M server, or the like. The node 30 can execute or include logical entities such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204. The device 30 can be part of an M2M network as shown in FIG. 23A-B or part of a non-M2M network. As shown in FIG. 23C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 23C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 23C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 23C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 23D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 23A and FIG. 23B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as SCM 402, Service Coverage Adjustment 416, Service Coverage Processing Component 414, Service Coverage Recording Component 404, Service Description Component 412, Service Provider 602, CSFs 2002 and CSEs 2004 as well as logical entities at service nodes 202, 204 and 205, and at sensors 102, 104, 106 and 108 and logical entities to produce interfaces such as interfaces 2202 and 2204 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:
1. A method comprising:
receiving information associated with a plurality of requests for a service type;
sending, to each service node of a plurality of service nodes that provide the service, a request for service coverage information, wherein service coverage of each service node is associated with a set of clients;
receiving, from each service node of the plurality of service nodes, based on each request for service coverage information, a service coverage report comprising an identifier of the set of clients and service node context information;
generating, based on each received service coverage report, a global picture of coverage provided for the service type by the plurality of service nodes;
determining, based on the global picture, a service coverage adjustment for at least one service node of the plurality of service nodes to accommodate the plurality of requests from the set of clients, wherein the service coverage adjustment adjusts an access rule of at least one of the plurality of service nodes associated with the set of clients; and
sending, to the at least one service node, a service coverage adjustment notification to cause the service coverage adjustment by the at least one service node.

2. The method of claim 1, wherein each service coverage report further comprises a service node address, a service coverage type, a service provider, and an effective time of service coverage.

3. The method of claim 2, wherein the service coverage type comprises the access rule.

4. The method of claim 1, wherein the service coverage adjustment notification indicates a reduction of coverage for the at least one service node, wherein the reduction causes a reduction to the set of clients.

5. The method of claim 1, wherein the service coverage adjustment notification indicates an increase of coverage for the at least one service node, wherein the increase causes an increase to the set of clients.

6. The method of claim 1, wherein each service node of the plurality of service nodes comprises a machine-to-machine device, gateway, or server.

7. The method of claim 1, wherein the service node context information comprises at least one of service node location, service node power level, or service node load.

8. The method of claim 1, wherein the service node context information comprises service node location.

9. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
   receiving information associated with a plurality of requests for a service type;
   sending, to each service node of a plurality of service nodes that provide the service type, a request for service coverage information, wherein service coverage of each service node is associated with a set of clients;
   receiving, from each service node of the plurality of service nodes, based on each request for service coverage information, a service coverage report comprising an identifier of the set of clients and service node context information;
   generating, based on each received service coverage report, a global picture of coverage provided for the service type by the plurality of service nodes;
   determining, based on the global picture, a service coverage adjustment for at least one service node of the plurality of service nodes to accommodate the plurality of requests from the set of clients, wherein the service coverage adjustment adjusts an access rule of at least one of the plurality of service nodes associated with the set of clients; and
   sending, to the at least one service node, a service coverage adjustment notification to cause the service coverage adjustment by the at least one service node.

10. The apparatus of claim 9, wherein each service coverage report further comprises a service node address, a service coverage type, a service provider, and an effective time of service coverage.

11. The apparatus of claim 10, wherein the service coverage type comprises the access rule.

12. The apparatus of claim 9, wherein the service coverage adjustment notification indicates a reduction of coverage for the at least one service node, wherein the reduction causes a reduction to the set of clients.

13. The apparatus of claim 9, wherein the service coverage adjustment notification indicates an increase of coverage for the at least one service node, wherein the increase causes an increase to the set of clients.

14. The apparatus of claim 9, wherein each service node of the plurality of service nodes comprises a machine-to-machine device, gateway, or server.

15. The apparatus of claim 9, wherein the service node context information comprises at least one of service node location, service node power level, or service node load.

16. The apparatus of claim 9, wherein the service node context information comprises service node location.

17. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
   sending information associated with a plurality of requests for a service;
   receiving, from a second apparatus via a network, a request for service coverage information, wherein service coverage is associated with a set of clients;
   sending, to the second apparatus via the network, based on the request for service coverage information, a service coverage report comprising an identifier of the set of clients and service node context information; and
   receiving, from the second apparatus via the network, a service coverage adjustment notification to cause a service coverage adjustment to accommodate the plurality of requests for the service, wherein the service coverage adjustment adjusts an access rule of at least one of the plurality of service nodes associated with the set of clients and is based on a global picture of coverage provided for the service type by a plurality of service nodes that was generated by the second apparatus based on a plurality of service coverage reports.

18. The apparatus of claim 17, wherein the service coverage report further comprises a service node address, a service coverage type, a service provider, and an effective time of service coverage.

19. The apparatus of claim 17, wherein the service node context information comprises at least one of location of the apparatus, power level of the apparatus, or load of the apparatus.

20. A method comprising:
   sending information associated with a plurality of requests for a service type;
   receiving, from a second apparatus via a network, a request for service coverage information, wherein service coverage is associated with a set of clients;
   sending, to the second apparatus via the network, based on the request for service coverage information, a service coverage report comprising an identifier of the set of clients and service node context information; and
   receiving, from the second apparatus via the network, a service coverage adjustment notification to cause a service coverage adjustment to accommodate the plurality of requests for the service, wherein the service coverage adjustment adjusts an access rule of at least one of the plurality of service nodes associated with the set of clients and is based on a global picture of coverage provided for the service type by a plurality of service nodes that was generated by the second apparatus based on a plurality of service coverage reports.

* * * * *